United States Patent
Haba, Jr.

(10) Patent No.: US 11,416,900 B1
(45) Date of Patent: Aug. 16, 2022

(54) DYNAMICALLY GENERATED ITEMS FOR USER GENERATED GRAPHIC USER STORYTELLING INTERFACE

(71) Applicant: Eugene E. Haba, Jr., Bridgeport, CT (US)

(72) Inventor: Eugene E. Haba, Jr., Bridgeport, CT (US)

( * ) Notice: Subject to any disclaimer, the term of this patent is extended or adjusted under 35 U.S.C. 154(b) by 543 days.

(21) Appl. No.: 15/904,827

(22) Filed: Feb. 26, 2018

Related U.S. Application Data

(60) Provisional application No. 62/463,120, filed on Feb. 24, 2017.

(51) Int. Cl.
| | |
|---|---|
| *G06Q 30/02* | (2012.01) |
| *G06F 3/0481* | (2022.01) |
| *G06F 3/04842* | (2022.01) |
| *G06F 3/0488* | (2022.01) |
| *G06T 11/60* | (2006.01) |

(52) U.S. Cl.
CPC ....... *G06Q 30/0279* (2013.01); *G06F 3/0481* (2013.01); *G06F 3/0488* (2013.01); *G06F 3/04842* (2013.01); *G06T 11/60* (2013.01)

(58) Field of Classification Search
CPC ............... G06Q 30/02; G06Q 30/0243; G06Q 30/0251; G06Q 30/0271; G06Q 30/0276; G06Q 30/0279; G06F 8/20; G06F 8/38; G06F 8/34; G06F 17/50; G06F 40/103; G06T 7/001; G06T 7/0006; G06T 2200/24; G06T 15/10; G09F 27/00; G03B 23/105

See application file for complete search history.

(56) References Cited

U.S. PATENT DOCUMENTS

| | | | | |
|---|---|---|---|---|
| 2,189,285 A | * | 2/1940 | Gruber | G03B 23/105 |
| | | | | 359/467 |
| 5,940,082 A | * | 8/1999 | Brinegar | G06Q 10/107 |
| | | | | 345/442 |

(Continued)

FOREIGN PATENT DOCUMENTS

CN 1755592 A * 4/2006

*Primary Examiner* — Andrew R Dyer
*Assistant Examiner* — Tyler Schallhorn
(74) *Attorney, Agent, or Firm* — Fish & Richardson P.C.

(57) ABSTRACT

Techniques are described for dynamically generated items for user generated graphical user storytelling interfaces. For instance, a system provides a visual storytelling interface used in a campaign. The system includes a graphical user interface (GUI) campaign control, deployment, and management system. The GUI campaign control, deployment, and management system is configured to enable facilitators to define parameters for visual storytelling interfaces associated with campaigns launched by the facilitators and deploy the visual storytelling interfaces for display on display screens of viewer computing devices. The system also includes a digital image creation system configured to enable generation of custom dynamically-generated GUI items to appear in the visual storytelling interfaces controlled by the GUI campaign control, deployment, and management system. The digital image creation system is configured to enable generation of the custom dynamically-generated GUI items by interacting with creator computing devices used by creators of the custom dynamically-generated GUI items.

19 Claims, 10 Drawing Sheets

(56) References Cited

U.S. PATENT DOCUMENTS

| | | | | |
|---|---|---|---|---|
| 6,791,530 B2* | 9/2004 | Vernier | G06T 1/00 | 715/788 |
| 7,321,919 B2* | 1/2008 | Jacobs | H04N 1/00132 | 709/205 |
| 7,516,419 B2* | 4/2009 | Petro | G06F 3/0482 | 345/184 |
| 8,234,168 B1* | 7/2012 | Lagle Ruiz | G06Q 30/0267 | 705/14.64 |
| 8,237,704 B1* | 8/2012 | Dubnow | H04N 13/183 | 705/26.5 |
| 8,311,889 B1* | 11/2012 | Lagle Ruiz | G06Q 30/0267 | 705/14.64 |
| 8,549,432 B2* | 10/2013 | Warner | G06F 3/04817 | 715/834 |
| 8,601,389 B2* | 12/2013 | Schulz | G06F 3/0482 | 715/810 |
| 8,621,366 B1* | 12/2013 | Sampath | G06Q 50/01 | 715/751 |
| 8,719,730 B2* | 5/2014 | Ganetakos | A63F 13/537 | 715/834 |
| 9,076,346 B2* | 7/2015 | Quattrocchi | G09B 15/002 | |
| 9,104,705 B2* | 8/2015 | Fujinaga | G06F 16/54 | |
| 9,390,472 B2* | 7/2016 | Citrin | H04N 1/00461 | |
| 9,483,584 B2* | 11/2016 | Batra | G06F 30/00 | |
| 9,632,662 B2* | 4/2017 | Chmielewski | G06F 3/0482 | |
| 9,766,606 B2* | 9/2017 | Fadell | F24F 11/46 | |
| 9,870,350 B2* | 1/2018 | Schiffer | G06K 9/6201 | |
| 10,162,519 B2* | 12/2018 | Hoffman | G06F 3/0482 | |
| 10,241,482 B2* | 3/2019 | Fadell | F24F 11/46 | |
| 10,459,819 B2* | 10/2019 | Chen | G06F 11/323 | |
| 10,606,469 B2* | 3/2020 | Jiang | G06F 3/04883 | |
| 2002/0063734 A1* | 5/2002 | Khalfay | G06F 8/30 | 715/744 |
| 2002/0101418 A1* | 8/2002 | Vernier | G06T 1/00 | 345/418 |
| 2002/0101449 A1* | 8/2002 | Friskel | G06F 3/14 | 715/762 |
| 2002/0149619 A1* | 10/2002 | Sauer | G06F 3/0481 | 715/762 |
| 2004/0133489 A1* | 7/2004 | Stremler | G06Q 40/12 | 705/35 |
| 2005/0033669 A1* | 2/2005 | Stremler | G06Q 40/12 | 705/30 |
| 2005/0183012 A1* | 8/2005 | Petro | G06F 3/0482 | 715/713 |
| 2006/0271691 A1* | 11/2006 | Jacobs | H04L 67/22 | 709/228 |
| 2007/0021973 A1* | 1/2007 | Stremler | G06Q 30/0279 | 705/1.1 |
| 2008/0080774 A1* | 4/2008 | Jacobs | H04N 1/00177 | 382/220 |
| 2008/0102422 A1* | 5/2008 | Hayes | G06Q 30/02 | 434/107 |
| 2008/0270941 A1* | 10/2008 | Kim | G06F 3/04842 | 715/830 |
| 2009/0100333 A1* | 4/2009 | Xiao | G06T 11/206 | 715/252 |
| 2009/0167783 A1* | 7/2009 | Fujinaga | G06F 16/54 | 345/619 |
| 2009/0204920 A1* | 8/2009 | Beverley | G06T 3/4038 | 715/848 |
| 2010/0030613 A1* | 2/2010 | Williamson | G06Q 30/06 | 705/7.27 |
| 2010/0257182 A1* | 10/2010 | Saliba | G06F 40/253 | 707/747 |
| 2010/0281374 A1* | 11/2010 | Schulz | H04M 1/72469 | 715/830 |
| 2010/0281430 A1* | 11/2010 | Safar | G06F 3/0488 | 715/834 |
| 2010/0306702 A1* | 12/2010 | Warner | G06F 3/04817 | 715/834 |
| 2011/0047014 A1* | 2/2011 | De Angelo | G06F 3/0482 | 705/14.4 |
| 2011/0066980 A1* | 3/2011 | Chmielewski | G06F 3/0482 | 715/834 |
| 2011/0265041 A1* | 10/2011 | Ganetakos | A63F 13/533 | 715/834 |
| 2012/0226978 A1* | 9/2012 | Harberts | G06F 3/0485 | 715/702 |
| 2013/0151509 A1* | 6/2013 | Tran | G06F 16/9577 | 707/723 |
| 2013/0191461 A1* | 7/2013 | Batra | G06F 30/00 | 709/204 |
| 2013/0290116 A1* | 10/2013 | Hepworth | G06F 3/0482 | 705/14.73 |
| 2013/0339907 A1* | 12/2013 | Matas | G06T 11/60 | 715/853 |
| 2014/0040712 A1* | 2/2014 | Chang | G06Q 30/0241 | 715/252 |
| 2014/0090084 A1* | 3/2014 | Goodinson | G06Q 10/101 | 726/28 |
| 2015/0006366 A1* | 1/2015 | Sobhani | G06Q 20/10 | 705/39 |
| 2015/0007707 A1* | 1/2015 | Quattrocchi | G09B 15/023 | 84/477 R |
| 2015/0026609 A1* | 1/2015 | Kim | G06F 3/0484 | 715/762 |
| 2015/0067551 A1* | 3/2015 | Zhu | G06F 8/38 | 715/762 |
| 2015/0233595 A1* | 8/2015 | Fadell | G05D 23/1902 | 700/278 |
| 2015/0254807 A1* | 9/2015 | Citrin | H04N 1/00506 | 382/284 |
| 2016/0027193 A1* | 1/2016 | Schiffer | G06T 11/206 | 345/440 |
| 2016/0092098 A1* | 3/2016 | Kim | G06F 3/04845 | 715/771 |
| 2016/0158648 A1* | 6/2016 | Adamson | A63F 13/63 | 463/31 |
| 2017/0083585 A1* | 3/2017 | Chen | G06F 11/323 | |
| 2017/0123648 A1* | 5/2017 | Mozumder | G06F 3/04845 | |
| 2017/0147160 A1* | 5/2017 | Snyder | G06F 3/04883 | |
| 2018/0129174 A1* | 5/2018 | Fadell | F24F 11/63 | |
| 2020/0026634 A1* | 1/2020 | Chen | G06F 11/3409 | |
| 2020/0201487 A1* | 6/2020 | Grossman | G06F 3/04842 | |
| 2021/0073924 A1* | 3/2021 | Ndeuchi | G06F 40/166 | |

\* cited by examiner

Fig. 3 Circle system schema

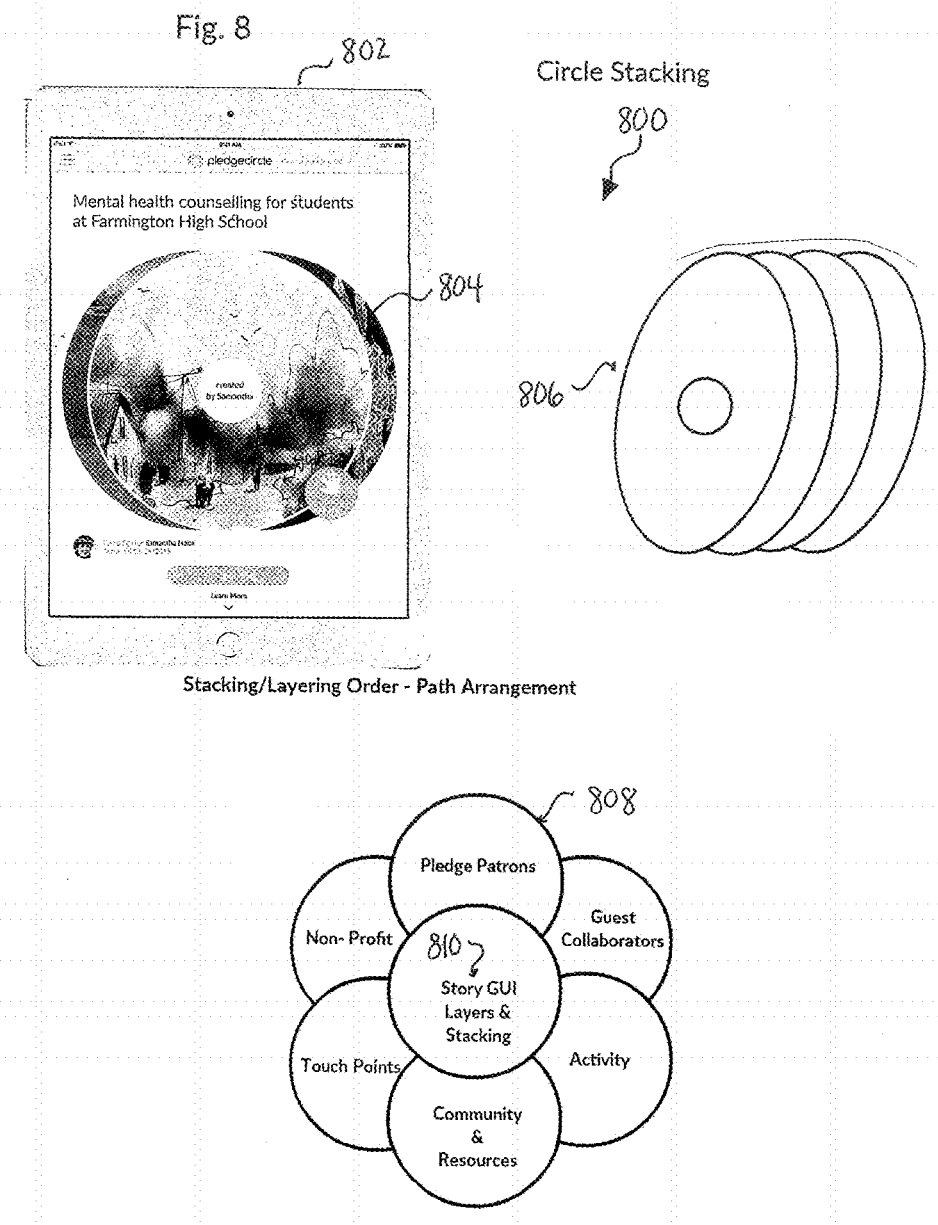

Fig. 9           Display Area Embodiments
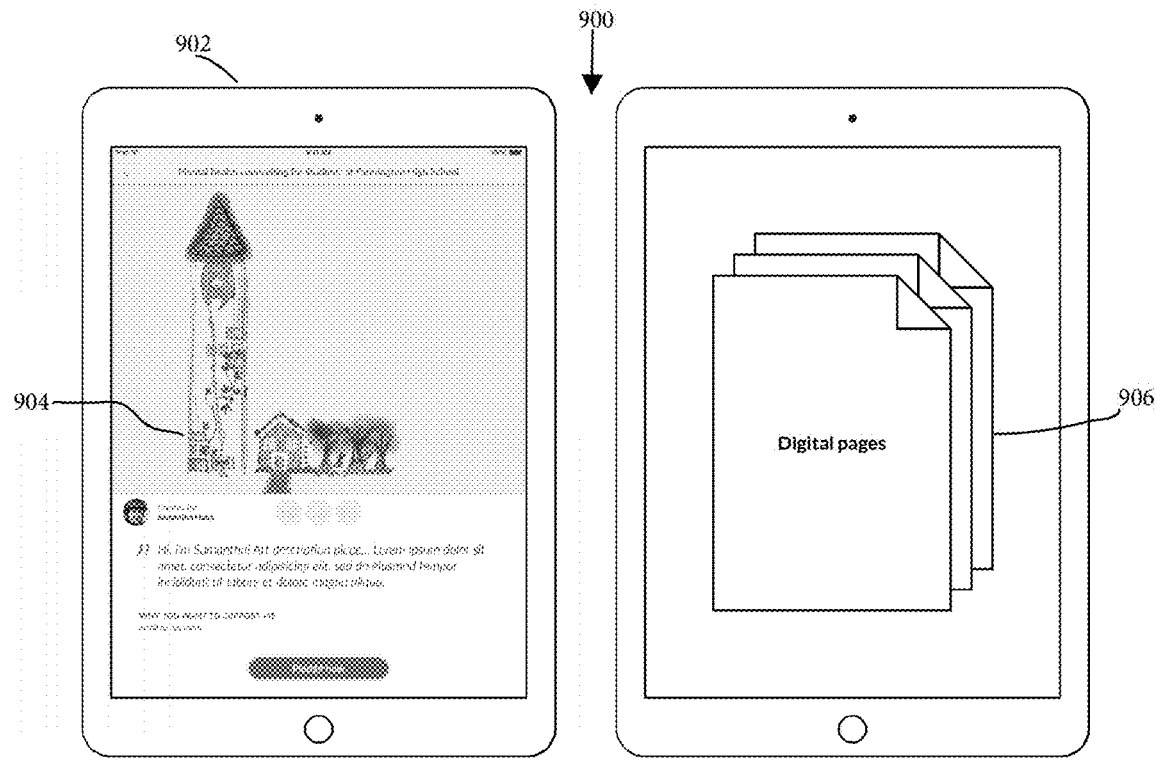
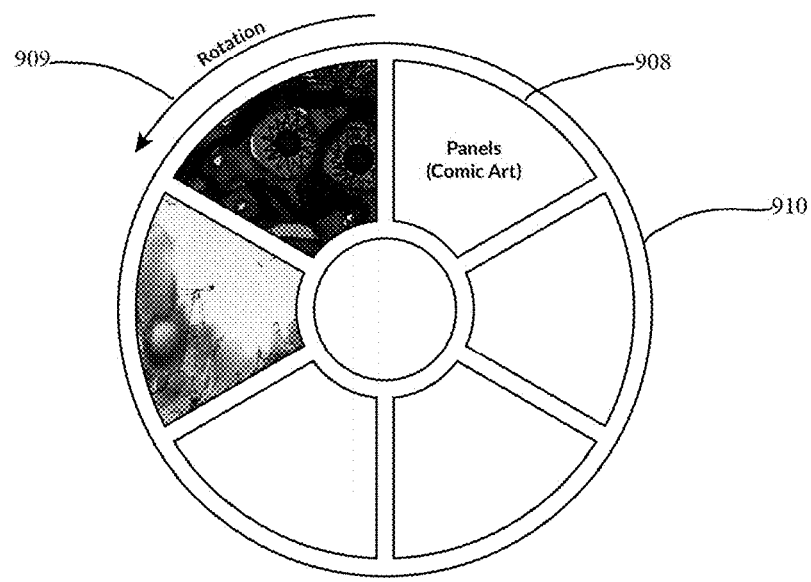
Custom or formatted narrative sequence panels

DYNAMICALLY GENERATED ITEMS FOR USER GENERATED GRAPHIC USER STORYTELLING INTERFACE

CROSS-REFERENCE TO RELATED APPLICATION

This application claims the benefit of U.S. Provisional Application No. 62/463,120, filed Feb. 24, 2017, and titled "DYNAMICALLY GENERATED ITEMS FOR USER GENERATED GRAPHICAL USER STORYTELLING INTERFACE," which is incorporated by reference in its entirety.

FIELD

The present application relates to a unique, customizable, and interactive graphical user storytelling interface.

BACKGROUND

Techniques have been developed for digital image creation on the web. For example, digital drawing or inking applications may use a finger or stylus, GIF creation, animation, or other techniques to create art or graphics used for applications, such as doodling for note taking, presentations and general art creation. Photo images that can be enhanced with filters also are taken with smartphone cameras and shared on various social networks or as a social network application.

BRIEF DESCRIPTION OF THE DRAWINGS

FIG. 8 illustrates a possible user generated content storage system represented as a "circle stack" path arrangement to store and access content both during and after campaigns;

FIG. 9 illustrates "area of display" shape or form embodiments which GUI items can appear;

DETAILED DESCRIPTION

Figure 1:
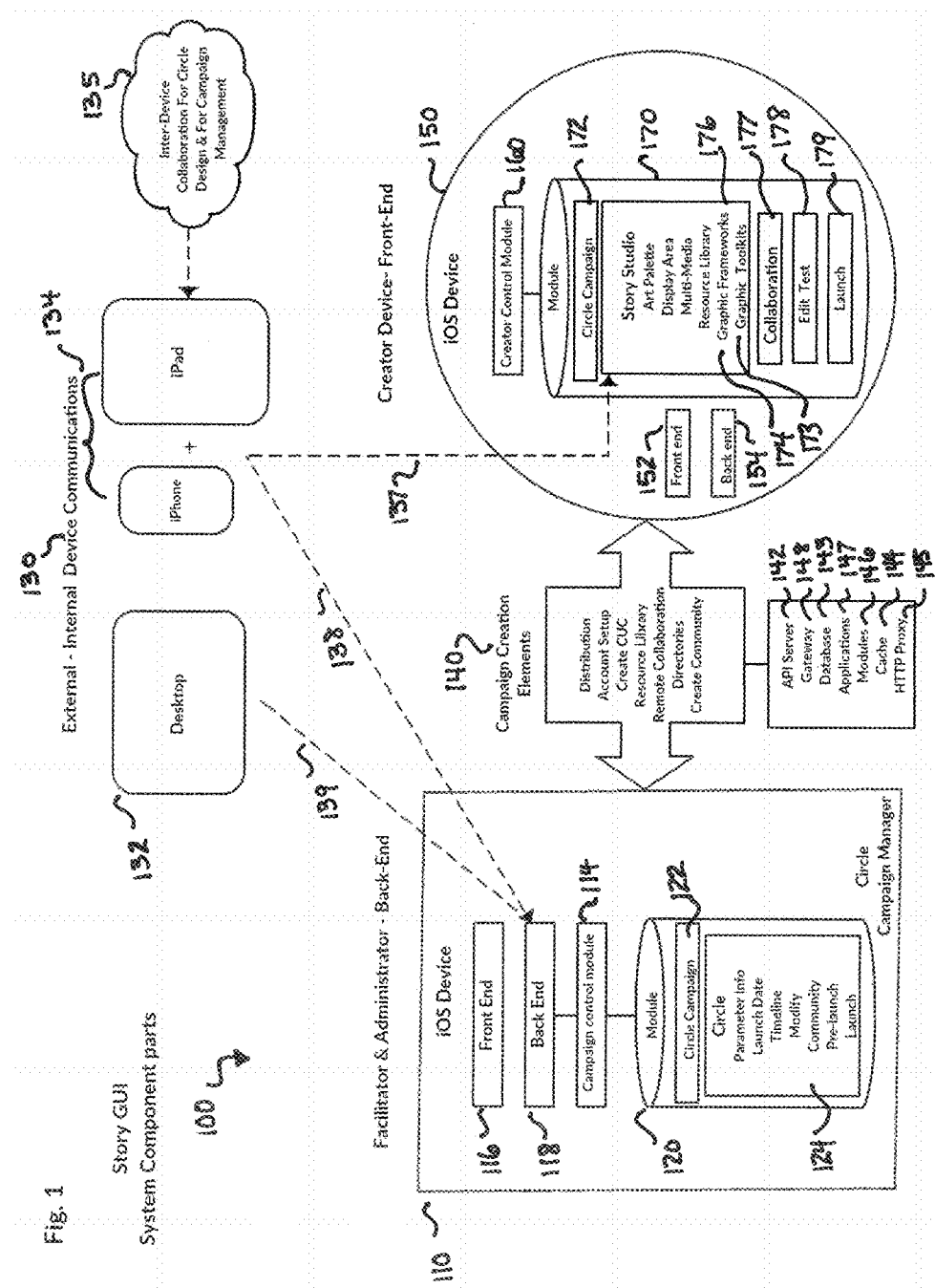
FIG. 1 is a functional block diagram of the component parts of a Story GUI creation, deployment, control and management system.

In some implementations, a process or method enables a self-created customizable graphical user storytelling interface ("Story GUI") on a computing and/or communication device to be used in the process of visually communicating awareness through a digital application. Although current technology allows for the creation of digital images on computing platforms and operating systems, there are no mechanisms for using digital imagery custom created by a user and expressed in a style, such as a narrative art style, and spatially displayed on a communication or computing device as a communication mode for the purpose of creating visual or pictorial awareness of a cause. In these implementations, the process is reusable/repeatable, dynamic, interactive in a leveraged managed process. Furthermore, a system allows the creation of such digital interface content on the same platform in a single process operated like a social network. The system can then distribute such completed interface content in an interactive way to all computing and communication devices to complete the intended process behind the interface content. The following description teaches a system that provides a custom interactive graphic user storytelling interface (and processing method) that allows a single user or group user to create digital interface items (e.g., in the form of digital art) currently on a tablet or smartphone device utilizing an operating system that allows for the creation of such interface items, which then can be launched or distributed as a utility application to other users via email and social media channels to induce the viewer to complete an operation based on interactive elements offered by the processing method.

The Story GUI display and process method described herein utilize graphical technology to create interface items (e.g., graphical art) in a process to communicate a need for awareness of a cause in an interactive and integrated way. The present application provides a social application that users download on their smart devices and use to self-direct and manage all of their GUI-driven campaigns in one application. There is a trend developing where users are using their smart devices such as tablets and smart phones as a social network itself, comprised of a plurality of item specific applications or social network applications that appear on their glass or display screen as their preferred applications of use which provides a single function alone, but as a whole, function as their personal social network rather than going to one large centric network. For instance, users may have an app for instant messaging, an app for videos, an app for music, an app for micro blogging, and an app for disappearing ephemeral visual images. The present description provides an app with many of these features for GUI-driven campaigns without the need to download multiple campaign (e.g., crowd-funding) applications.

The Story GUI interactive system allows users to create unlimited graphic items (e.g., imagery) in any medium and theme and compose it in a variety of configurations or styles including narrative story style sequences or episodes and in conjunction with music and distributed on any variety of screen shot views and configurations, with touch screen heuristics that communicate the need in a single simple process or over designated time periods and then prompting engagement of the viewer to support the cause by joining communities and supporting the cause completing the process. One current spatial display configuration is in a circle design format that the created graphical items, as surface ornamentation, is uploaded to with touch screen functions which the creator can activate to launch the process. In another display, the creator can utilize a visual annotation tool that a viewer touches to gain insight, from the creator, either textually or other media, into the pictorial composition. It also allows the viewer to provide their own insight or commentary on the graphics, which encourages a retelling of the graphical meaning, and then promotes the meaning of the story through sharing tools to peoples in their social media channels.

The Story GUI system also allows interaction by all engaged users encouraging interaction by commands with the Story GUI created by the Creator. For instance, a viewer activates the Story GUI with a touch screen prompt, "Please touch my GUI", which can activate a story narrative sequence which then allows the viewer to further engage the Story GUI with other touch screen functions that help facilitate the intended process all in a self-contained automated managed process. In applications where a group is supporting a campaign, the spatial display can be shown with two GUI's, one by the group and a separate by an individual of that group that are displayed on the same screen but act independently separated by a register divider and are integrated together in the same process. Another application allows the Creator to collaborate with other Creator contributors who can, from a remote device, participate jointly in the creation of the Story GUI. Other Story GUI contributors include a mentor collaborator, a non-profit or one of its member beneficiaries (e.g. a cancer patient) or a community member such as a business and its employees. The collaborated Story GUI can then be displayed as a single image or in separate sequences representing each contributor's creation.

In some implementations, in a K-12 student environment, a system is provided for combining mandatory and voluntary requirements into a Story GUI with a pre-determined formula of pledging one minute of community service for each pledge amount. The system includes GUI icons that can display goals, service hours pledged, button icons that offer alternative pledge incentives and options, custom generated interactive avatar icons for all application users, tools and the back end to manage the process in real time until the pledges promised are completed, the pledge contract honored, whereas funds are released and distributed to the intended beneficiaries completing the circle. Additionally, the process includes a database function of active vetted non-profit user community participants that can also offer community service hour programs which facilitates the student user in selecting, planning, and documenting a community service process in one contained system.

According to an example process, a model exists that operates as a "multiplier effect" and functions as a self-directed managed account for all users, where users may pledge one of four assets (money, property, knowledge, service) in the process of campaigning for any charitable enterprise utilizing the circular platform communicated by the GUI mechanism. In particular, the model process guarantees 100% of all pledges pass to cause recipients without expense. In most applications, causes will receive a multiple of pledged monies due to the multiplier effect the model incentivizes and leverages for advocates on behalf of their causes of choice as well as the value of a multiple of other assets pledged by community members during the campaign.

Briefly, a custom created interactive GUI storytelling system or GUI creation, management and control operations are described that present custom generated Circle themed campaigns comprised of a custom created GUI items with interactive features and a supporting Circle campaign management system used in the campaign. There are four "character users" that can contribute to the creation, management and control of the system as used in the fundraising system. In most cases there will be, the Creator, the Facilitator, the Influencer and the Supporter.

The Story GUI and Circle campaigns itself are created and displayed on mobile operating system platforms such as iOS and their supporting devices including smartphones and tablets such as an APPLE IPHONE AND APPLE IPAD, as well as other mobile platforms, and then also displayed on mobile wearables as well as web based computing devices such as desktops and notebook/laptops. The mobile wearables may include watch-type devices (e.g., smartwatches), glasses-type devices (e.g., digital eyewear with a heads up display (HUD)), or any other types of wearable devices. The mobile wearables may include standalone wearable computers or wearable devices that interact or tether to other computer devices (e.g., smartphones or tablets). Further, the supported devices (e.g., wearable or other devices) may include augmented reality (AR), virtual reality (VR), and mixed realty (MR) devices that enable interaction with Story GUI and Circle campaigns through augmented, virtual, and/or mixed reality experiences. An example is a supported device using a holographic display to present Story GUI and Circle campaigns and enable viewer interaction with the Story GUI and Circle campaigns through interaction with displayed holograms.

The Story GUI system is represented as a Circle comprises the following elements. The Story GUI itself representing the surface ornamentation created by its creator(s), the display area embodiments on the screen glass on system authorized smart mobile devices, representing the article of manufacturer the Story GUI is to be displayed on, the Circle campaign theme structure including text, audio, video and music elements that can be used to support the campaign story. Lastly, a payment system exists to facilitate the method of processing pledges in support of the Circle campaign. This can be represented as GUI (Graphic User Interface) storytelling system=Circle+GUI Items+Contributions as the three sub-components.

The display area for each Story GUI used in a Circle campaign may be the mobile glass screen itself or in the form of a circle or additional circles organized in a circle stack pathway arrangement if needed in a sequential storytelling format. In other cases, though, one circle can be sufficient to initiate the story. A separate GUI prompts a viewer to touch the GUI items thus commencing the storytelling sequence which could include the circle moving in clockwise or counterclockwise rotations to facilitate the visual story sequence. Other GUI's prompt the viewer to potentially engage in the story sequence with touch-points on the glass screen prompting even more engagement. In other embodiments of possible display areas for the system, digital pages, art panels and screen edge to screen edge horizontal layouts are possible (see FIG. 9 for discussion).

Aside from the storytelling GUI in the display area comprising much of the visual elements of the storytelling feature, other GUI's on the display screen can disclose other elements comprising the campaign. These can include campaign theme title, fundraising need, creator name, influencer contributions, campaign status, make a pledge and access to more information about the campaign participants and beneficiaries.

In most cases, each Circle campaign begins with a Facilitator that originates the campaign and may set the campaign theme and control parameters. Then a user Creator is selected to create the Story GUI itself which initiates the campaign mission visual story telling sequence to raise awareness and to then solicit support from the Supporter. In many cases the Facilitator can be the Creator as well (e.g., a student required to perform mandatory community service hours combines their need to raise money, like for a school class trip, by selecting a non-profit as a beneficiary of their volunteer hours in a "your dollar, my hour" quid-pro-quo). In other cases, the Facilitator can be the manager of a larger enterprise such as a non-profit, corporate sponsor, classroom or school in charge of a campaign where students or the actual beneficiaries of the campaign themselves, like a cancer patient, are the Creators. In some cases, the Creator may request the assistance from a participating collaborator which could include an artist, literary or musician Influencer or other third party. In some cases, the Story GUI can include multiple co-creators like in a classroom. In one embodiment, an entire classroom can be represented as the Creator or group Creator, and in another embodiment, there is a single group Creator GUI as well as individual Creator GUI's representing the students supporting the classroom group or in another user case, a third party group which could include a company's marketing department or marketing agency, or in a company department (e.g., sales department). In these cases, both group and individual GUI's can appear and function in the same Circle campaign in real-time. In other third party group collaborations, a campaign sponsor can interact with the GUI theme creation or in content generated within additional Circles within a circle stack that support the campaign as shown in FIG. 8.

While the Story GUI is built on mobile smart devices such as with iOS and ANDROID operating systems (e.g. tablet and large screen smart devices) as well as the other elements to complete a Circle campaign, web based computing devices such as a desktop and notebook/laptop may be used to help create the non GUI elements of the Circle campaign in addition to managing and operating the campaign system.

The computing devices may operate on both web and mobile networks to selectively display the visual storytelling GUI within the Circle campaign which can be modified on many display screen sizes. In all cases, each Circle campaign has off-line and real-time activity. Off-line is where the campaign theme parameters are set and to be managed (e.g. Choose same theme such as breast cancer awareness, but launched from 1,000 school classrooms) and where the Story GUI is created. Real-time launch activity allows Circle campaigns to execute their mission parameters through the GUI story by communicating with multiple computer devices. While built and launched from an iOS IPAD for example, the campaign can be viewed and interacted with either via a web based desktop with set mouse functions or from a compatible mobile smart device with touch-point heuristic controls allowing for more interactive engagement operations with Supporters and Influencers.

The web and mobile based computing devices screen sizes aforementioned may display the Story GUI. However, in most embodiments, the tablets and larger screen smart phones with larger screen sizes will be the Creator devices and web based desktops and notebooks/laptops will be receiving devices of the Story GUI within the campaign. In such graphic display systems, while the campaign can be managed with a campaign manager module on all devices, only the Creator device via a creator control module within the mobile app can monitor and control actual touch screen activity amongst viewers interacting with the Story GUI.

Further, the campaign and Story GUI display system may be controlled so that each Story GUI is aware of other device users effecting the GUI story within the online network. In this manner, the set or group of all system device users may be considered part of the story.

Significantly, each active mobile app device user may be aware of other GUI activated devices in a geographic location (e.g., runner participants in a real-time cycling fundraising event), and are controlled by a centralized campaign controller (e.g., a campaign manager module or GUI campaign executed on a Mobile App).

Since a plurality of remote computing devices may be used to implement a Story GUI system, it may be useful to first discuss a creation method and control/management method (or multiple computing device systems incorporating such control/method systems) for use in managing a single or group of Story GUI system campaign circles numbering 2 to millions or more on supported computing devices. This discussion of a creation and control method may then be followed by specifics on particular implementations of a Story GUI system that may or may not execute as an individual campaign by a single Creator but for the control of such a large number of GUI supported Creator device users simultaneously to act as an open source stack of engaged contributors to a larger GUI story.

Briefly, the creation method of Story GUI's is represented by back-end processes within the Story Mobile App with a back-end creator control module (e.g., includes unlimited graphic software frameworks, toolkits and library resources to create Story GUI's) allowing creations to be uploaded and displayed on various embodiments of display areas on device screens prior to real-time launch activity. The result of the described creation of a single or multiple GUI's in a campaign can be a collaborative (e.g., a third party or group assists in the Story GUI creation) and coordinated visual story as part of a campaign prior to launch and subsequent interactive creation elements after launch (e.g., a touch-point feature that allows viewers to touch the Story GUI and provide textual or visual feedback or insight about the Creators creation or even add content to the story) that can add to or alter campaign GUI's that further facilitates the process of Supporter engagement and the pledging of currency.

Briefly, the control methods are represented by back-end process including a web-server controlled system with multiple modules and web and mobile applications. The processes are hierarchical in a way that the web-server and main databases represent the system logics and store data for each Creator and Supporter user device to engage in a Circle campaign. The result of the described control of a single or multiple GUI display can be a closed campaign such as 100,000 participating classrooms raising awareness for a cause such as Leukemia which can be a coordinated in such a manner with a campaign control module with set timelines and funding goals. The control method may be implemented in a system with five general components or sub-component parts of the system: a campaign creator/manager module; at least iOS mobile system recognized computing creator devices and GUI receiving devices; a web-server controlled system schema including web and mobile applications; a Story GUI creator control module; a payment gateway. These five components of the control method/system are described below with reference to the figures.

First, FIG. 1 illustrates a system 100 that may be used to create and control a single or multiple GUI's during a cause campaign on a front-end Creator device 150 such as a tablet or smartphone on a mobile OS platform such as iOS and the back-end campaign requirements shown as the Circle campaign manager 110 on the Creator device.

Figure 3:
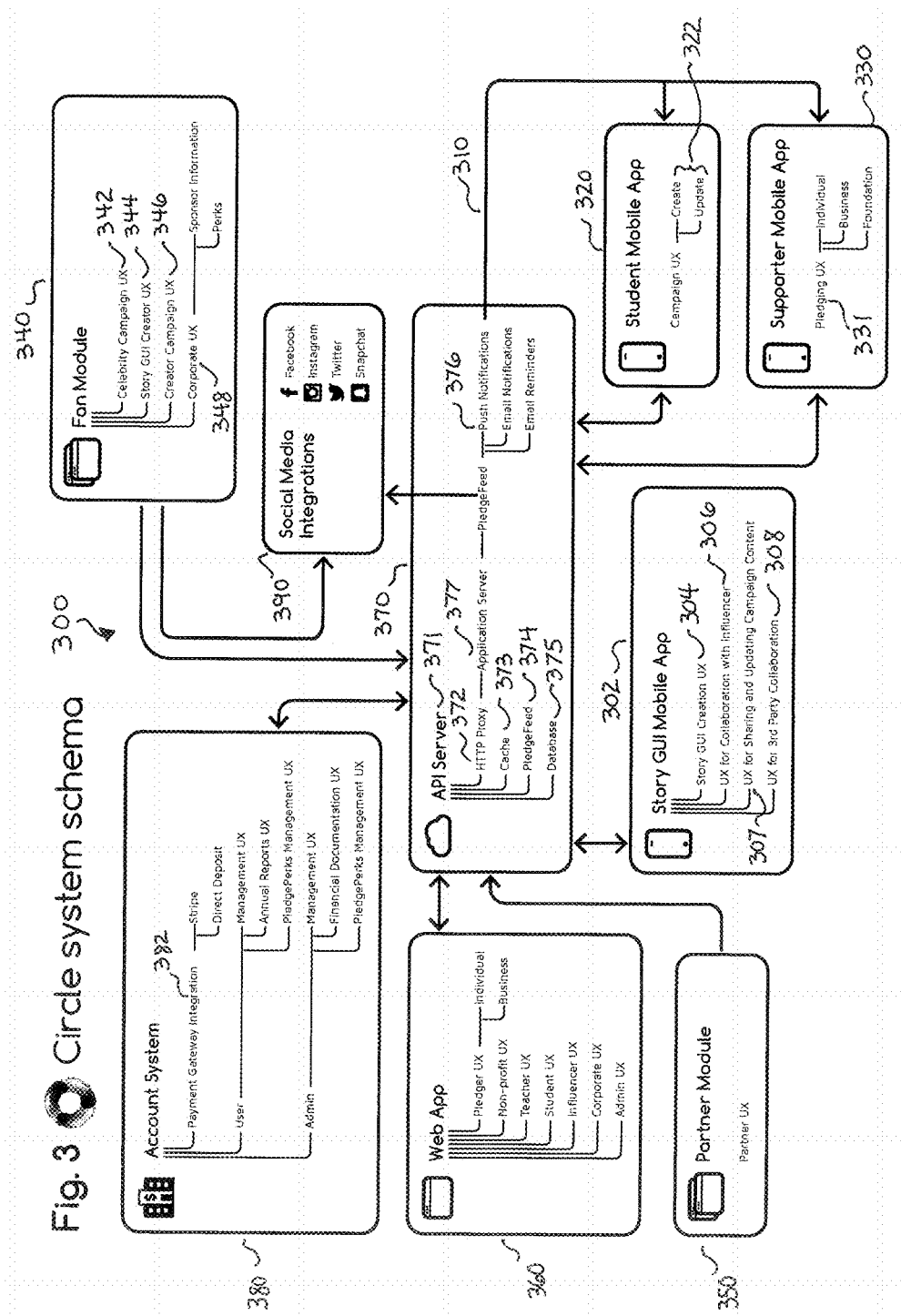
FIG. 3 provides a system schema logic schematic for the logic that operates the system architecture for both web and mobile network applications.

The system 100 includes a back-end campaign control module 114 along with a front end creator control module 160 on creator devices 134 shown as 150 as well as campaign receiving devices 132 (e.g., web and mobile network devices), with each creator device 134 being implemented (as shown via arrow 137) with the configuration of an iOS creator device 150. As shown, the plurality of GUI receiving devices 130 is configured for external-internal campaign communications as well as inter-device third-party collaboration 135 for campaign and Story GUI design on creator devices 134. The web-server controlled system 142 with supporting database 143, cache 144, HTTP Proxy 145, Feed 146, application server 147 and payment gateway 148 and detailed in FIG. 3, represents the logic for all devices in the system.

Back-end and front-end communication between the Circle campaign manager 110 and the Story GUI creator device 150 during offline campaign creation and real-time launch activity is provided by the web/mobile network connections through the API server 142, applications 147 and modules at 148. In some campaign embodiments, third party and Influencer collaboration (e.g., a corporate partner, or non-profit helping set campaign curriculum or through a Partner module described in FIG. 3) at 135 during campaign creation on creator devices 134 are delivered (shown at 138) to the back-end 118 of 110 and delivered (as shown at 137) to the workstation at 176 during creation or through collaboration modules at 177 where partners, celebrities with fans are invited to create a Story GUI together as a group during the campaign run). In some embodiments, a web based device 132 (such as a desktop) can contribute to the campaign (shown at 139) during non-runtime activity (e.g., helping set campaign parameters from a work station desktop).

The system 100 shows both off-line and non-runtime activity for both 110 and 150 as well as real-time and run-time activity. During non-runtime, the Circle campaign manager 110 is used to create and upload campaign requirements like a campaign theme, funding requirements, partner participation, launch date, etc. as shown in 124 as well as interfacing with the front-end interface at 116. The GUI creator device 150 is creating and uploading the Story GUI at 170. During real-time run-time activity, the Circle campaign manager 110 through the campaign control module 114 can allow Facilitators and administrators to manage the parameters of the campaign in real time through the creator control module 160 (e.g., to modify the funding goal requirement or to extend the campaign timeline depending on the status of the campaigns progress) impacting the content that appears on the front-end 152 interface of the Story GUI during run-time. At the same time, the creator control module 160 allows the creator to change or alter run-time activity of the campaign as well as the Story GUI itself. For example, the creator can allow additional GUI elements to appear on the display screen to further engage the Supporter during the storytelling sequence (e.g., authorize a separate Story GUI to appear on the display screen, such as a Story GUI as described in FIG. 6, that allows viewers to touch and provide insight or feedback to the creation or even alter the actual GUI image itself by allowing it to change when a Pledge is made).

The Circle campaign manager 110, representing the back-end of the campaign creation and the GUI creator device 150, representing the front-end visual storytelling interface, is shown to include an API Server 142 that runs all processes and application software to perform the functions of the Circle campaign manager module 110 and creator module 170 discussed herein. This includes the cache memory 144 and the database 143 to store and manage data generated and received from all users (e.g., to execute the Feed application described in FIG. 3) participating in the Story GUI system, which comprises a Circle campaign at 122 within the campaign manager module 120 and its component elements 124, a Story GUI at 176 within the GUI creator module 170, it's component elements including the campaign at 172, collaboration 177, edit test 178, launch 179 and the payment method at 149. Other essential campaign creation elements that support both the campaign 110 and Story GUI 150 are shown at 140.

Each GUI creator device 150 represents a smartphone or tablet 134 with a mobile operating system which can build a Story GUI used in the system. This application within the system is referred to as a Story Mobile App (See system schema FIG. 3). The app has both a back-end 154 and front-end 152 function. The back-end 154 includes the server 142 that helps launch the program but also the non-runtime activity that helps create the total campaign at 172 that supports the creation through the creation module 170 which comprises the core building elements at 176. The application server 147 linked through the HTTP Proxy 145 processes all graphic software frameworks at 174 (such as Open GL ES) and graphic software toolkits 173, that allow for unlimited digital imagery creation that be created on a touchscreen such as with a finger, stylus or mouse on web based devices or even being able to draw images with your eyes which can then be displayed on the screen glass within the selected area of display.

The creator control module 160 acts to monitor both the creation of the Story GUI and campaign theme and its expected and actual state during an actual real-time active campaign on each creator device. For example, the module 160 during run-time may allow the creator to allow viewers to provide insight or feedback about their creation by activating a TouchPoint GUI that could be represented by a symbol like a digital map pin that appears on the GUI indicating this area can reveal some insight from the creator, and allowing the viewer to comment either by text or through their own visual insight using the tool to add visual insight which could be displayed on a separate circle and stored within a circle stack which can be accessed and viewed by other participants. In another use case, during creation, the creator may allow other users like a beneficiary to collaborate in the creation. In such a case, the beneficiary (such as a cancer patient, or a student) could be in a remote location like a hospital or school, where through their own device 134, participate in the creation of the Story GUI (shown at 137) in the workstation 176 through a collaboration module 177. In a group control setting, a collaboration module like a Fan module (described in FIG. 3) and found at 177, allows the creator to select a celebrity to help set the campaign theme and allow the celebrities fans to create their own GUI's individually and represented as a stack of circles that help share the cause story.

The GUI Story Studio at 176 comprises all the elements for a user to create the Story GUI as the visual storytelling component of the system. It is the core element in a Circle campaign that also includes the campaign theme elements and the payment gateway.

Within the story studio and once a user Creator logs in through a sign-up feature, a creator has the option to select from unlimited graphic applications to create art images that comprise the final Story GUI to be uploaded within a selected area of display. Unlimited graphic software frameworks (e.g., such as Open GS EL, vector graphics scripting, core animation) graphic toolkits, multi-media applications (e.g., mixing photographic images with drawing or inking functions as well as music from a playlist, as well as "paper to digital" by digitizing handwritten notes, sketches, drawings from paper or from other substrates) exist as well as resource libraries from which the creator can choose during the production process. Based on these graphic and media creation tools, the story studio can allow the Creator to create unlimited GUI items utilizing such art themes as: Comic Art (e.g., including super-hero and comic strip); education art; therapy art; religious art; poetic art; word art; sports art; STEAM art (e.g., science, technology, engineering, art, math); interactive art (e.g., art that reacts to a visitors touch) or in art mediums such as: Inking; anime; photo; pixel; 3D; animation; video; oils; watercolor; pastels; charcoal; penciling; etching; illustration; tattooing; caricature; doodling; graffiti, and in forms such as: Realism; abstract; modern; mixed-media, and shared in a variety of narrative storytelling styles within the selected "area of display" on the device by the creator. These themes, mediums and styles can be selected from a visual dashboard palette that can be represented as its own creation module (e.g., the Creator selects the super-hero module).

As discussed above, once the Story GUI has been completed within the creator module 170 and the Circle campaign theme 110 have been set, an edit test at 178 is requested as a pre run-time test before actual run-time launch and real-time activity.

The campaign control module 114 acts to monitor and manage the expected and actual state of each Circle campaign whether there is one creator device or thousands. There can be a creator and separate facilitator/administrator manager for each campaign or the creator can be both. For example, the school fundraising administrator at a large non-profit like LLS (Leukemia & Lymphoma Society) sets the campaign theme and funding goals for thirty thousand K-12 schools they are partnered with resulting in 450,000 students participating creating their own Story GUI. Based on this monitoring, the campaign control module may make adjustments such as using the following priorities: Localization (e.g., local, State, regional, national, global campaign activations); funding parameters (e.g., student, classroom, school, state, region, national goals achieved); demographic participation (e.g., age, gender, K-5, 6-12, individual, group); ranking (e.g., amount, gender, public, private, region); dateline (e.g., average campaign completion, campaign timeline, pledge periods); campaign performance (e.g., adjust timeline, funding goals, participant level or other operating parameters to meet campaign needs); campaign status; and operator performance needs.

Figure 2:
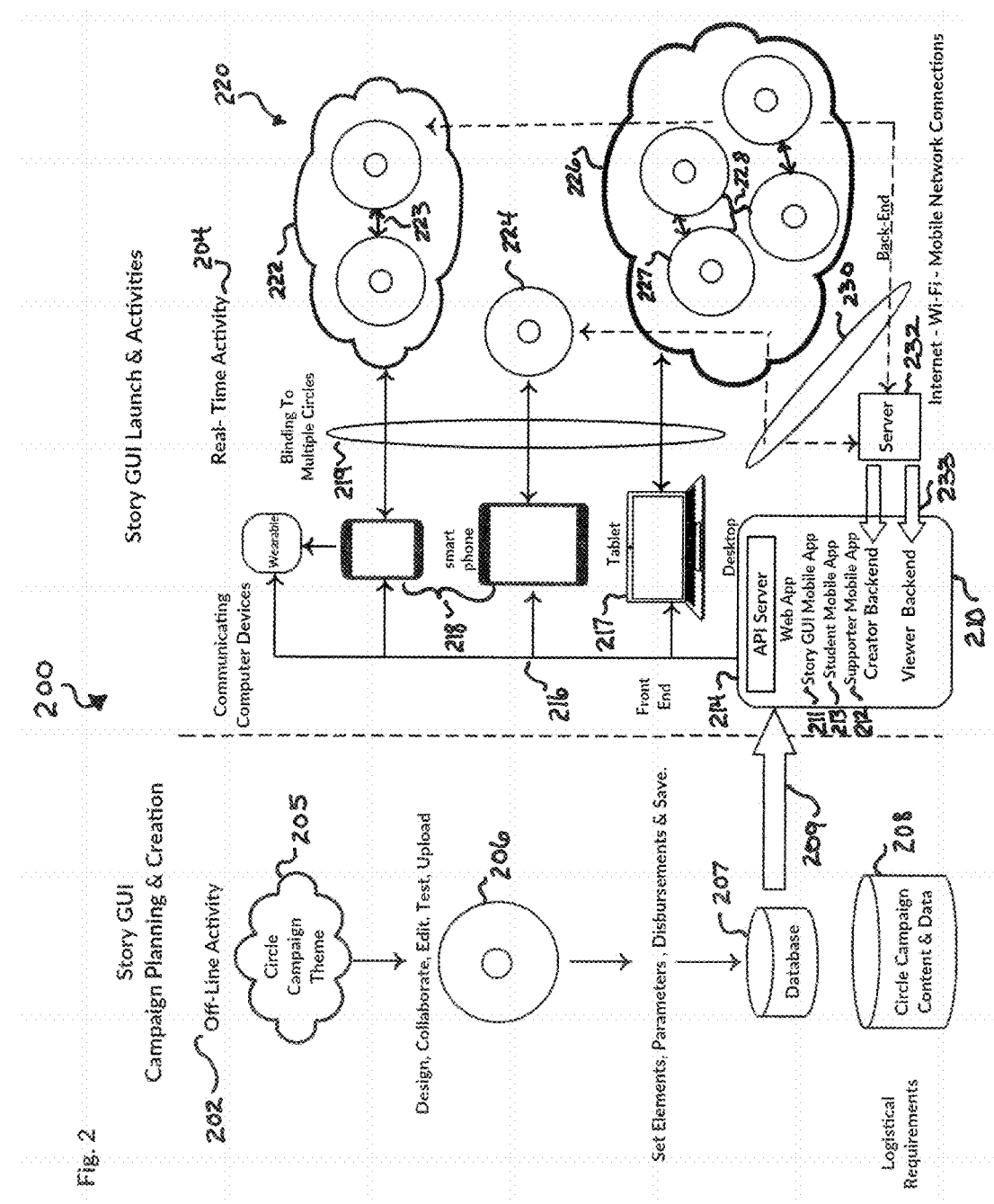
FIG. 2 is a functional schematic or block diagram of a system for use in planning, deploying and managing single or multiple GUI-driven campaigns both during off-line and real-time activity.

FIG. 2 illustrates a system (or a Circle campaign management control system) 200 for use in managing Circles in a campaign whether it's a single campaign within a creator device or thousands synchronized to a coordinated fundraising themed cause event. The system 200 is shown to be made up of or include components used to perform non-runtime or off-line activity at 202 and used to perform run-time or real-time activity at 204. The off-line activity 202 may include designing a Story GUI 206 within a Circle campaign or selecting a campaign theme 205 or a coordinated campaign for a plurality of Circles 205 to achieve a particular fundraising goal.

The Circle campaign theme (e.g., digital data stored in memory or the like) 205 may then be processed with the computer operating system (e.g., such as iOS) within the creator device or with collaborative support from non-creator devices such as a desktop as previously shown in FIG. 1 at 132 and 139 and modules like Partner 350 and Fan 340 (described in FIG. 3) to operate either as single stand-alone creator campaigns or in a coordinated group or groups in support of a chosen cause campaign event as shown at 206. For example, each creator device to be used in support of a coordinated storytelling event may be modeled as a single or group participant of the main story (e.g., super-hero's fighting blood cancers) to define a coordinated theme with rules and guidelines for each creator device (e.g., each GUI creator device can have its own super-hero creation but participating in and supporting the same cause, funding goal and timeline).

The created campaign or parameters for single or group user creator devices is then exported to memory and database 207 or of each creator device for processing during the creation stage and the campaign management stage. Each GUI creator device has its own data file for its respective creation and participation level in the campaign. Each of these data files is processed to generate real-time functions for each GUI creator device to be achieved over the campaign timeline (or performance of a creator specified task (s)). This processing can create individual or group campaign guidelines 208, and such processing or generating of campaign plans 208 may include processing the modeled campaign theme 207 based on specified logistical requirements. These requirements (e.g., adjusting funding goals based on progress results or redirecting assistance to lower performing creator campaigns or a corporate sponsor announcing a matching-grant challenge to the campaign) may modify a campaign to suit a particular campaign objective or because of a change to participating Circle creators based on real-time activity (e.g., a campaign shuts down due to unforeseen circumstances, like the health of the creator or an event at school).

The logistical requirements may also include setting specific tasks for each user participant in the campaign (e.g., Facilitator, Creator, Influencer, Supporter) where each device, whether a mobile device or web-based device (e.g., desktop, notebook), can interact with the campaign during its run-time activity (e.g., depending on touchscreen usability heuristics, non-creator mobile devices with different operating systems and user interfaces can access campaign management controls for the campaign). The campaign management component 202 may be considered a component that translates central campaign controller commands to creator device actions that are sent 209 to mobile apps, user modules and web applications 212 via push notifications by the HTTP proxy within the server 214 at the campaign control system (CCS) 210.

At 209, the off-line back-end campaign theme and planning as well as GUI story are provided to the campaign control system (CCS) 210 as used in FIG. 3. The system 200 further includes a number of computing devices, including creator devices 218 and web-based devices 217 that can host the campaign(s). Also included are a number of creator device Circles 220 shown in the form of group circles in this example. The Circles 220 may be in groups/sets with group 222 shown to include two Circles 223 representing a smaller group like a classroom that could range from 10-25 students (e.g., a classroom of 15 students could include 15 Circles). In other examples of small group embodiments, two students (e.g., each with a Circle) from different classes or two classrooms (e.g., one group Circle per classroom) can launch at the same time in a competition for the same cause theme or other campaign parameters (e.g., which circle raised the most money or which circle had the most creative story). Other groups/sets may include just one Circle 224 (e.g., representing a single student or group such as a single classroom), and group/set 226 that includes four Circles, representing larger groups such as the possibility of thousands or hundreds of thousands of Circles. These groups/sets may act or function together to create and support a campaign or act independently as a stand-a-lone.

In other cases, all of the creator devices may be considered part of larger groups/sets that perform together as the central story or otherwise has its contents synchronized by the campaign plans 208 to complete the central story. In another case, the central story isn't set and the sum of the contents of each Circle story create the story in real-time. As shown at 228, a Circle 227 in the group 226 can communicate with all the group inclusive Circles pertinent to the designated campaign so as to determine their individual and group status and if needed modify their campaign parameters to maintain campaign timelines and other campaign tasks. (e.g., Circle facilitator/creators could issue a request to modify the storytelling interface if a matching gift challenge that was issued to the group from a sponsor, didn't execute on their display screen during run-time).

As discussed with reference to FIG. 1 at 130, the system 200 includes two communication channels between the CCS 210 and each of the creator devices 220. The front end channel is shown at 216 with the CCS using web-based internet and wi-fi mobile network connections 212 to communicate data and controls 219 to each of the creator devices 220. In this manner, the CCS 210 binds to multiple Circles so as to allow coordinated campaign control data managed at 208 to each Circle 220 before real-time launch operations are initiated by the CCS 210.

The back-end channel for communications is shown at 230 with each of the creator devices 220, which may have two channels, mobile 138 and web-based 139 as discussed with reference to FIG. 1, communicating data (e.g., launch date, funding goals, time-line, status updates) to the CCS 210 as shown relayed 233 via a server 232. Each creator device 220 may include a unique passcode or ID with their campaign plan data (e.g., the same ID as used to associate a campaign 208 with a particular creator device 220.

In the system 200, each of the Circles containing the Story GUI may be displayed on a communicating computer device 216 or on a creator device that can control or modify at 210 the campaign parameters during off-line activity 202 and real-time activity 204. For example, during real-time activity, an Influencer such as a guest artist can announce contribution to the campaign in the form of an additional GUI in a circle stack that can be revealed at the end of the campaign. This modification to the campaign can act as a perk or incentive reward to encourage participation and support with a pledge. In another example, the campaign can receive a matching grant challenge during run-time that modifies the funding goals of all participating Circles. In one implementation, all creator device Circles 220 were modified via software (e.g., Partner module at FIG. 3) to provide all the logic (e.g., see FIG. 3 and corresponding system schema discussion) required for operation in a campaign environment including linking logic, interactive strategies, campaign curriculum, notifications, partner participants, expression logic, viewer participation strategies and communications between web and mobile channels.

FIG. 3 illustrates a flowchart or Circle system schema represented as a GUI creation and deployment system or logic 300 showing arrangement connections, relationships and sub-system components that may be implemented on communicating computer devices and creator devices (e.g., creation via the creator control module 160 as shown for a user creator device, such as an iOS smartphone or tablet 150 in FIG. 1). In the system schema 300, the Story GUI as shown in FIG. 1 at 100 begins at the Student Mobile App 320 with a user creator device and the Story GUI creation at 302, with campaign parameters managed at 110 and 170 in FIG. 1 at the Student Mobile App at 322.

At this point, the process 300 for a campaign starts at 320 with the creator, which could also be the facilitator, selecting and setting the overall UX campaign parameters at 322 and then the Story GUI which is built within the Story Mobile App at 302.

As shown via component connecting arrows at 310 throughout the entire system schema, all component parts and their requests are connected and processed through the central system logic at 370. (e.g., the Student Mobile App 320 is connected to the Story Mobile App 302 and its applications processed through push notifications 376 to user applications 377 processed through the HTTP proxy 372 within the API server 371. This also includes memory cache 373, Feed 374 (a process data feed) and databases 375 for all Circles that may be created during a campaign and stored for possible campaign continuation.

During the campaign creation process, the Story GUI itself 304 as discussed at 170 in FIG. 1, may be designed in collaboration with an Influencer 306 (e.g., artist inspiring a theme) or in collaboration with a third party user 308 (e.g., such as a corporate partner or its brand marketing agency creating GUI content additions and contributions or participating in the storyline that further engage and connect the campaign and viewer audience to a theme message). Sharing and updating campaign content that applies to the Story GUI creation occurs at 307. (e.g., classroom facilitators set an art theme such as comic art for a superhero campaign for 30,000 classrooms where the classroom and students create their own superhero figure but to fight blood cancers to raise awareness for a non-profit such as LLS).

The mobile apps at 302, 320 and 330 operating either as GUI creator devices and/or campaign receiving devices represent the mobile/wi-fi communication network of the system as also shown at 134 in FIG. 1. Other system components that support Story GUI creation such as modules at 350 and 340 can also support web applications 360 at the back-end of the application (shown at 118 in FIG. 1) for web communicating computer devices (shown at 132 in FIG. 1) for web network connections. (e.g., a facilitator may use a web based computing device such as a desktop at work for creating and updating campaign parameters).

During the Story GUI campaign creation process, the method 300 may involve web UX (user experience) applications at 360 with a determination of whether any user groups will be active in contributing to the campaign theme creation or managing their interaction with it. Since only mobile supported creator devices can create Story GUI's, the web UX applications are reserved for users served by web computing devices such as desktop or notebooks. If not, the entire campaign process can be built on mobile supported creator devices but communicated on web devices without touch screen functions (e.g., a viewer can receive the campaign on a desktop but only use mouse functions to engage with interactive features such as clicking a Story GUI to view insights of the GUI items revealed by the creator). In cases during a campaign where a user group just needs to manage pledged contributions, they can access the app via their desktop. For example, with the corporate UX, a single employee or entire department can coordinate planned contributions to the campaign via the Supporter UX processed through the web server located at 370.

After the campaign parameters are set at 320 (e.g., a student or non-student facilitator) and GUI story is created at 302 (e.g., student or beneficiary or other designated creator) and the campaign launched (shown at 179 in FIG. 1), the Supporter Mobile App at 330 is the receiving application for users who may select to pledge to real-time active campaigns. Supporters are represented at 331. At any point during the campaign run-time, a Supporter may elect to make a direct pledge through a payment GUI utilizing credit card gateways or through alternative payment platforms such as PAYPAL. The Supporter may also select within the process 300 its own payment account system at 380 providing Supporters a method to self-direct and manage pledged giving within their own account and activated after a sign-up process.

The process 300 provides methods of payments within the GUI system either through a mobile or web app. As discussed above, payments can be made without setting up an account within the process 300 (e.g., just click a pledge button GUI and process a simple credit card transaction outside the system), or a Supporter can choose to sign-up for a PDMF Account shown at 380 with a separate internal payment system and tools to manage planned giving. For example, a Supporter may set up an account and deposit funds from which they can transfer via a pledge to active Circle campaigns but held in escrow and only released to the beneficiary when the campaign creator completes their stated campaign pledge. This internal Supporter Advised Multiplier Fund avoids the use of credit/debit card transactions or other private payment gateway platforms.

The process 300 may also contain modules shown at 340 and 350 and at 120 and 170 in FIG. 1 that allow the Story GUI to be created and launched in campaigns that include embodiments of different user groups and applications. One example shown at 340 is a Fan module. In this user case, a celebrity persona 342 (e.g., say a musician such as Taylor Swift) utilizes the Story GUI to promote a personal foundation or cause by enlisting their fan base (through their own social media destination channels or by a Feed 374 to their social media integrations at 390) to participate in the storytelling campaign. The creator campaign UX at 346 and 110 acts as the facilitator setting the campaign theme which could be the celebrity and may enlist corporate sponsor participation at 348 and also shown at 135. An artist Influencer can assist student creators during Story GUI creation at 344 and shown at 177 on the creator device. For example, the celebrity selects a theme to raise awareness and funding for breast cancer research at 122 in FIG. 1, with parameters set at 124. Fans are invited to participate by downloading the app 340 and going through a sign-up process. They receive the campaign parameters and create their Story GUI at 344 and detailed at the creator device 150 in FIG. 1. After launch at 179, the celebrity at 342 through the campaign control module 114 can update or change the parameters (e.g., during the campaign the musician can announce a perk or join a student GUI-driven community as an unannounced guest to show encouragement and support. The musician can even allow their own music to be used in the creator campaigns and accessed from a music playlist in the mulctmedia library in the Story Studio shown at 176).

Another example of a module is a Partner Module at 350. In this scenario, user groups can exist as partners where an organization with a cause can announce partnerships with corporate or non-profit organizations through which student creators participate in a campaign and use the GUI as the storytelling platform. In a possible use case, parameters are set by a non-profit acting as the facilitator and shown at the creator campaign UX 346 through which student creators at 344 will be required to complete a research project or task (such as service work) and turn their research into an "artistic expression". (note: all modules share the same functionality so the functions of 340 are the same for 350). GUI content can be the "expression" and expressed into many styles of art created in the Story Studio at 176 and may include word art, poetic art, interactive art, therapy art and mixed-media art (inking, music, photos, video) as examples of artistic expression. Other partners can exist to create online content curriculum in support of the purpose of the campaign (e.g., this curriculum can appear within the process 300 as its own circle created at 348 or through a non-profit UX web app at 360 and accessed by the intended recipient—in this case a student—from a circle stack as discussed in FIG. 8 to be used during and within the campaign boundary).

With the above discussion and general discussion of a GUI creation, management and control system (system 100 and 200) and the logic (system schema 300) understood, it may be useful to more specifically discuss functions of particular components of such a GUI creation system, the campaign and management control system CCS and the logic and controls of each creator device or other campaign receiving devices. With regard to the campaign control system (CCS), the CCS provides the applications and logic to control GUI creation, campaign state and payments.

During pre-launch, a creator uses the Student Mobile App to develop the campaign theme and the Story Mobile App to craft the GUI storyline on each creator device processed via the API server. Campaign and creator control modules allow users to monitor, control and manage all campaign functions and parameters during non-runtime and run-time activities. For example, during a campaign, the CCS through the campaign control module allows a facilitator (e.g., a non-profit administrator to schools) to run the campaign previously set on a creator device. This could include resetting the launch date, the total number of participating schools in the campaign and even how many and who will collaborate with the campaign including artist Influencers and corporate sponsors. During run-time, a creator (student) can through the creator control module allow activation of various interactive GUI's (e.g., a TouchPoint GUI that reveals insight into the meaning behind the creator's GUI) that viewers of the campaign can touch for further engagement.

During the campaign, the CCS can actively monitor the campaigns performance against pre-set parameters such as achieving funding goals by each Circle or in a larger group of circles. In some embodiments, the campaign control module has software/logic that compares the actual state of each creator device circle against the expected state at that particular time for the individual Circle according to the presently enacted campaign. For example, a classroom of twenty students can establish a group circle all contributing to a group GUI and with each student then creating twenty individual circles that operate independently of the group circle but contributing to the total classroom funding goal (see FIG. 7 for a discussion). The classroom teacher can act as the campaign facilitator and monitor the performance of each student circle and effect the state of underperforming student circles by allowing over-performing circles to assist with funding.

After the launch is initiated in a campaign by the campaign control module/CCS upon an operator (creator or facilitator or both) input, the CCS along with the creator control software on each creator device work to perform the pre-launch campaign mission objective. As discussed above, the control method and system taught herein combines both individual and centralized control (e.g., allow changes during a campaign) with creator devices to more effectively provide coordinated management of creator circles. In other words, the creator devices may each be given a particular campaign parameter that they work together to follow to complete a pre-determined storyline (e.g., hundreds or thousands of unique content circles linking together to complete a larger circle mural or circle stack of GUI's).

Prior to actual real-time launch activity, the CCS can be used to initiate a pre-launch of each of the creator GUI's through the creator control module with push notifications shown at 376 to social media integrations or through the Feed at 374 to system members alerting them that a campaign with a particular theme is to be launched within a set time frame. In this embodiment, creators and campaign facilitators can adjust or modify campaign plans from data received from viewer responses. (e.g., business user groups may respond and indicate they would support particular non-profits or causes if advocated by student created Circle campaigns).

Figure 6:
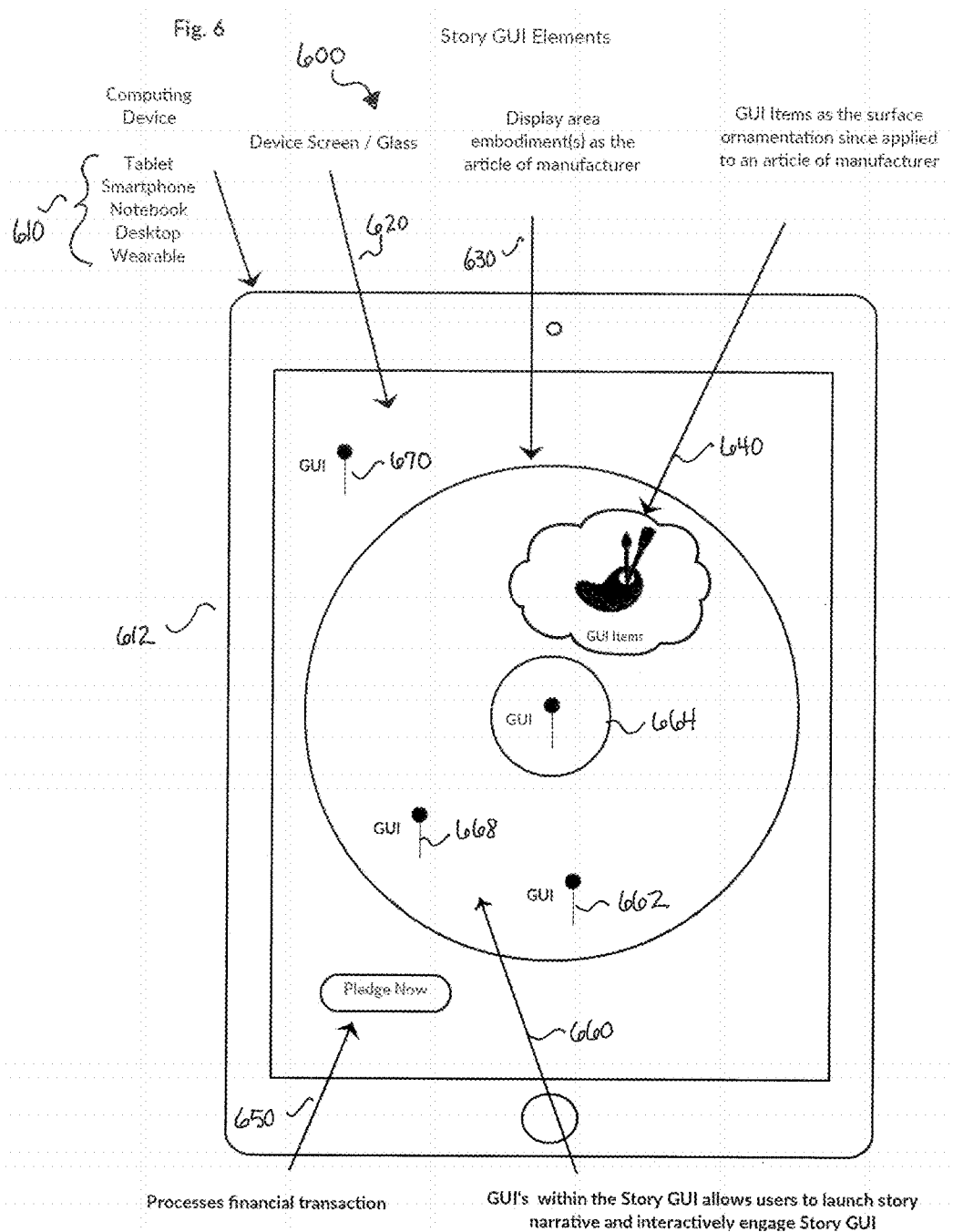
FIG. 6 illustrates various example elements of visual displays and user interactions of the Story GUI.

In other pre-launch activity embodiments, the creator through the creator control module can select or modify what appears on the display screen in conjunction with the central GUI story during a campaign on receiving devices through a selection of pre-set or custom GUI's that facilitate the overall viewer user experience (see FIG. 6 for a discussion). In some cases, a Supporter (business, foundation or citizen) may choose to issue a pre-launch matching fund challenge so as to encourage students to become campaign creators or facilitators. A payment selection feature on the Supporter Mobile App 330 allows the Supporter to select an available option and upload it to the display screen as its own GUI for all potential Supporters to see. This feature is also available during campaign run-time activity.

During operations, the CCS is used to initiate each of the Circle campaigns to begin their stored campaign parameters either as a single circle or in a binding group as they are launched through media integration channels to prospective viewers who then may engage the campaign through the Story GUI. In most cases the campaign is initiated by a GUI prompt (e.g., a "touch my art" GUI) superimposed on or part of the Story GUI itself that requires the viewer to touch the Story GUI on the display screen to begin the storytelling narrative. This touch screen heuristic may initiate the Story GUI content to rotate (e.g., in a counterclockwise direction) facilitating a movement that directs the viewer attention to the Story GUI and the content within. Interactive touch functions within the Story GUI guide the user to discover and learn more about the campaign. For example, the viewer through Story GUI prompts can access other content circles in a circle stack that previously existed or contribute their own circle content to the overall campaign community.

In some embodiments during campaign operations, the Story GUI can be modified as a result of software/programming to enhance viewer engagement and participation during the campaign. In one case, the Story GUI can start as one image and change or evolve by the contribution of a Supporter after a pledge is confirmed (e.g., in a comic strip format, the creator can create a strip of panels but leave the last panel word cloud empty, requiring the Supporter to add their own words of interpretation to complete the messaging). In another case, a Supporter can use a creation function in their Supporter Mobile App at 330 to create their own Story GUI and add it to the campaign in a separate circle that can be stored in a circle stack and viewed by all viewers to the campaign. Similarly, an unannounced "secret" artist can create their own Story GUI at 306 within the Mobile App 302 and as shown at 135 in FIG. 1 which can be added to the campaign circle stack and revealed at the end of the campaign as an incentive for creator and Supporter participation.

Generally, the CCS and the user control modules of the creator devices monitor pre-set campaign parameters both before and during launch activities until the campaign funding goals are met and the Circle shuts down, or remains open as a community by its member supporters to sustain the campaign's educational message. In other cases, though, the control modules of the creator devices act to determine whether or not a "campaign milestone" was reached within a predefined time window, with the campaign defining "milestones" for each Circle whether operating independently or in a group. If not (e.g., did not reach funding goal "X" by time "Y"), the campaign control or creator control module can modify the campaign by re-setting new "milestones". For example, a campaign may designate that a classroom funding goal is $3,000 and each of 20 students is responsible to raise $150. If a student gets sick or for any other reason can't complete the campaign, the creator control module can recalculate a new funding goal for each student to maintain the classroom goal. This may especially apply when predefined campaign time lines can extend for months, a whole school year or during the summer months when school isn't in session.

With regard to objectives and monitoring of campaign operations, each creator device and non-creator device (e.g., web-based desktop) with control operations may store a definition of a parameter range (e.g., funding or user participation level or geographic area or demographic) that defines a system boundary of a campaign. The creator device and campaign control modules compares the present status determined for a creator campaign and compares this to the parameter range. If this boundary is being approached, the control module can act to remind the user or issue an alert or automatically shut down the campaign. For example, the campaign parameter may define that students can only receive a maximum of "X" dollars in a scholarship fund pledged by Supporters as a reward for a superior campaign performance going viral within the network.

Further, regarding overall campaign operations, some embodiments of campaign and creator controls within the system may involve configuring the creator devices and their respective Circles to have circle to circle communications or other technologies on each creator device that provides a linking function. Each creator device circle and corresponding Story GUI could use its campaign and control module to "organize" a sort of Mob uniting circles together in support of a predefined campaign mission objective, or the Mob can occur spontaneously through the actions of one campaign creator campaign and action. (e.g., $5^{th}$ grade classrooms across the country organize to raise awareness and funding for an elementary school suffering damages from a natural disaster. Each classroom's Circle could be linked visually on the display screen in a separate circle stack but the campaign results and participation levels (shown as energy) could be displayed real-time through a new custom Story GUI created in the Story Studio at 176 in FIG. 1.

Figure 4:
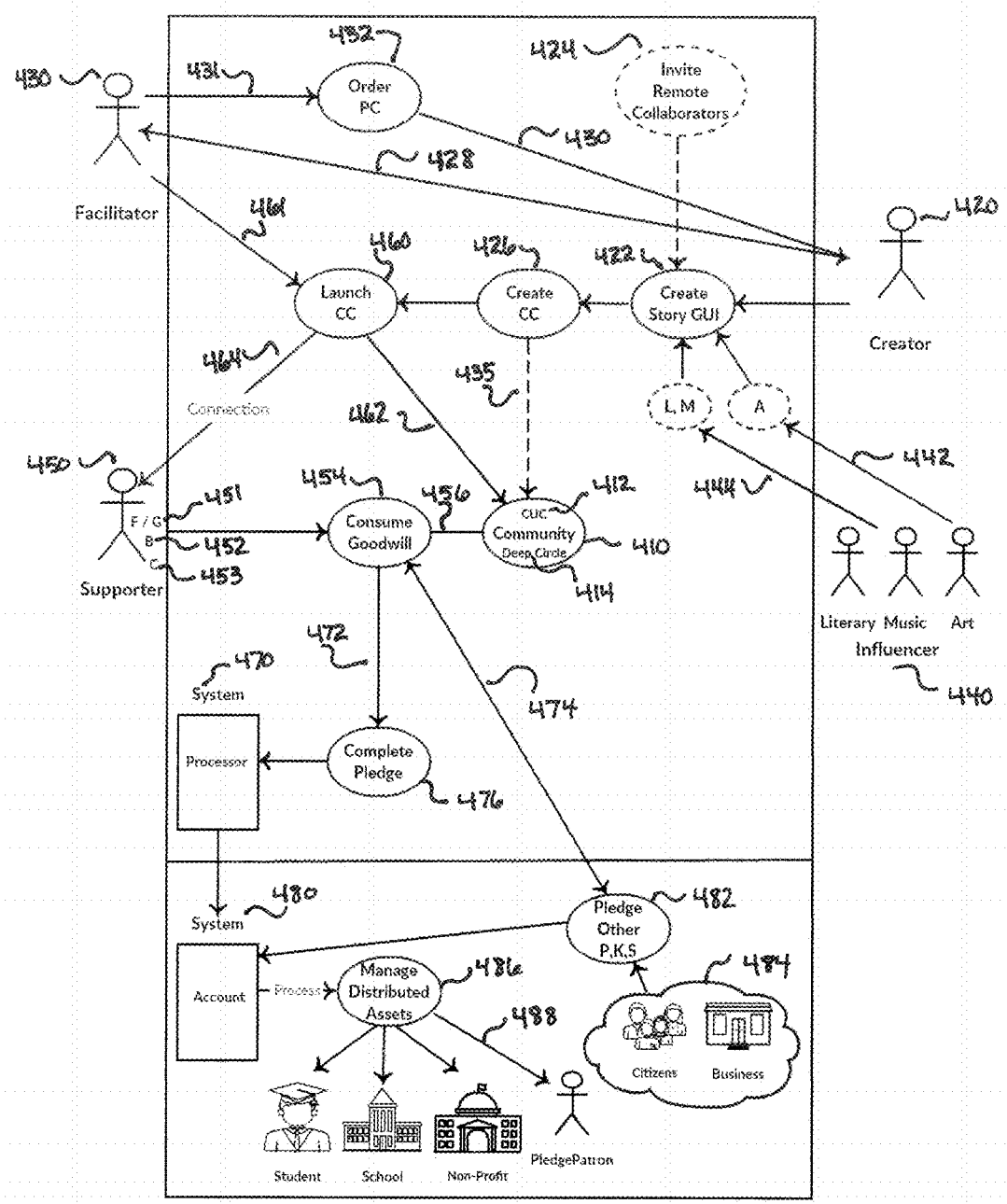
FIG. 4 illustrates the system-method boundary of user groups in the system.

With the above describing possible campaign operations in a campaign boundary, it may be useful to turn to a discussion of the Story GUI system boundary defining the system scope showing the possible responsibilities of all user groups, their requirements and some of the methods which implement and execute the desired system use functions. For example, FIG. 4 illustrates an exemplary use case system boundary for Story GUI system 400 during a typical campaign creation and launch activity to support the systems primary "character users" as previously discussed beginning with a Facilitator 430, Creator 420, Influencer 440 and Supporter 450. Other method requirements include campaign collaboration 422, a payment system 470 and other implementable components such as a managed giving account system 420.

In most cases, the Story GUI process begins at 430 with a Facilitator downloading the Student Mobile App at 322 and shown at 431 to execute a Circle campaign 432. At 432, an action is made to set the campaign parameters at 430 and to determine the creator 420 which can also be the Facilitator confirmed at 428 (e.g., a student simply needs to raise funds and creates and manages the entire campaign).

During Story GUI creation at 422, a determination is made if requirements will include the collaborate efforts of Influencers 440. Visual artists (A) at 442 may collaborate to craft the primary visual storytelling element while other Influencers at 444 literary (L) and music (M) may collaborate with storytelling lessons and musical elements (musicians and/or playlists) that combine with the Story GUI 422 to execute the completed Circle 426. Third party collaborators previously mentioned and also discussed at FIG. 5 and shown at 424 may be included in the Story GUI creation 422. Further, other component elements that comprise the total Circle campaign (e.g., a CUC or Community User Circle profile for non-profit causes to be displayed or accessed during the campaign) is created at 426 and connected to the community 410 via 435.

With the Circle campaign complete, it is launched at 460 by the Facilitator 430 via 461. Using social media integrations shown at 390, Feed 374, through Circle network connections all represented at 464 and at existing community activities via 462, Circle campaigns are received by potential Supporters at 450 that represent foundations/grants (F/G) 451, businesses (B) 452 and citizens (C) 453.

During launch, a Supporter 450 makes a determination whether to make a pledge or other asset, within the system or not, depending on whether the content (the cause appeal) expressed through the GUI storytelling interface is agreeable to the Supporter at 454. The Supporter can further decide to interact with the campaign through community functions via 456 at 410. At 410, campaign participants, including all four designated "character users" (420, 430, 440, 450) may choose, for example, to create a "community user circle" (CUC 412) profile that illustrates their involvement in a Circle community within the network. Another example may include joining a "Deep Circle" community 414, within the campaign that allows users to create a deeper and perhaps ongoing discussion of the subject of the campaign. Other community interactions and engagement features may be created to enhance the campaign experience.

If a Supporter decides to make a pledge shown at 472, payment of the pledge can be made by various methods at 476 and processed through pre-defined accepted payment platforms 470 such as credit/debit card gateways and independent payment platforms such as PAYPAL or STRIPE (shown at 382 in FIG. 3) that are integrated into the Story GUI system. Payments are then disbursed from the payment processor 470 directly to designated pre-approved (e.g., banking relationship established) campaign beneficiaries previously pre-defined during campaign creation prior to launch and only after all conditions and pledges set forth in the campaign parameters have been satisfied by all user participants.

In most cases, Pledges to a campaign by a Supporter may be in the form of money as discussed above. In some cases, other payment embodiments may be implemented such as non-financial assets pledged in support of a campaign. These non-financial assets can be represented as P for property, K for knowledge and S for service shown at 482 and processed through a separate independent account system 480 (e.g., PDMF for Supporter Advised Multiplier Fund) and also discussed at 380 in FIG. 3 within the Story GUI system. In this scenario, a Supporter can be a business who pledges a discounted service (Property) as a perk 488 to those who pledge money, or an attorney who pledges advice (knowledge) or a student who pledges volunteer service hours (Service) in the "your dollar, my hour" service pledge program as shown at 484 as examples of a range of potential pledged assets. These assets are managed and distributed to Circle community user participants via 486.

Figure 5:
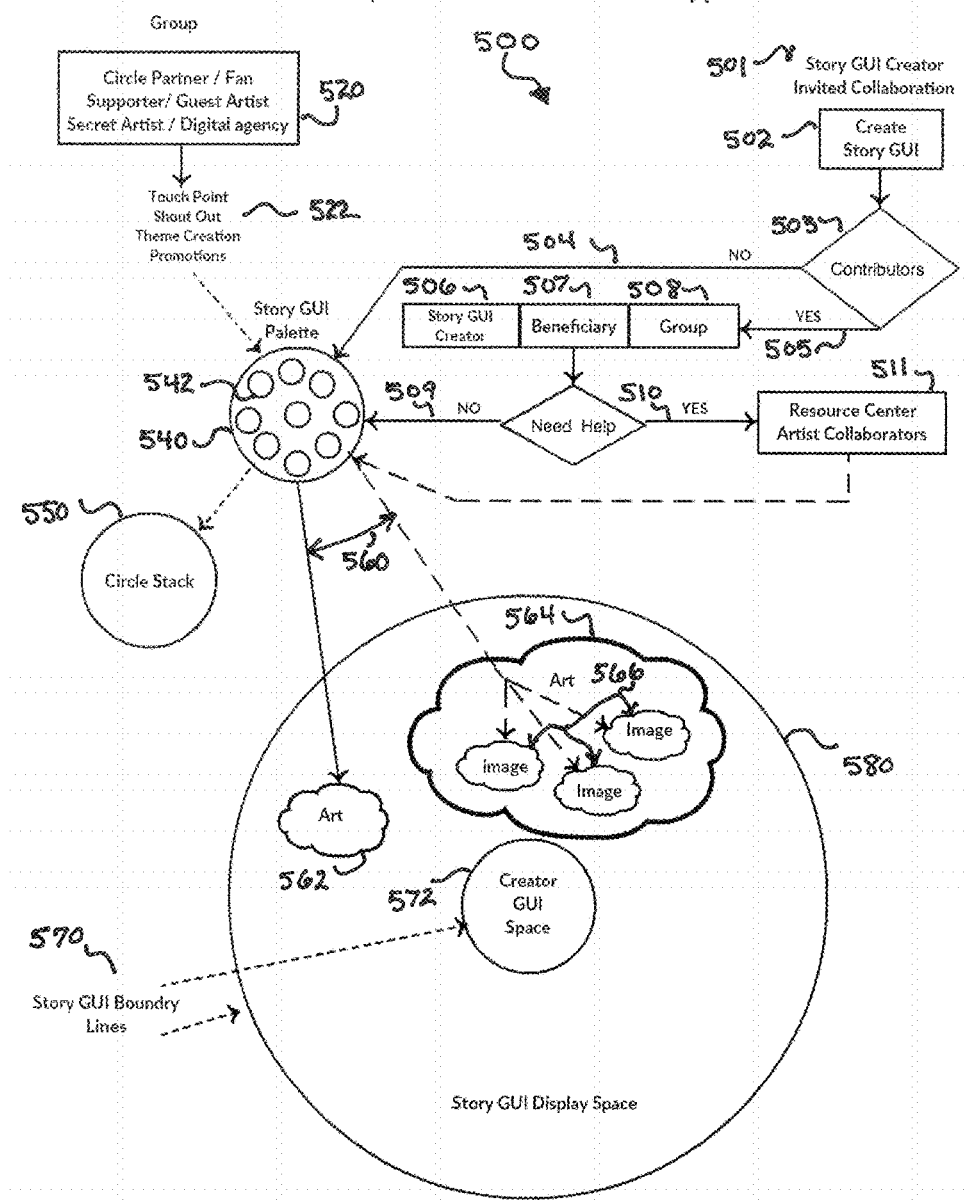
FIG. 5 illustrates third party collaboration applications within the system.

FIG. 5 illustrates the third party collaboration application 500, as previously discussed in FIG. 4 at 424, that allows outside collaboration in the creation of the Story GUI as part of the total Circle campaign itself within the Story GUI system.

With this in mind, any Circle creator 501 decides at 502 to create the Story GUI, and which level of collaboration from potential contributors 503 or Influencers 511 may be requested or required to complete the Story GUI. A creator may decide to be the sole creator and elect at 504 no contributors, proceeding directly to the palette 540 within the Story Studio and selecting an art style from a library of art modules 542 to create the Story GUI 562 as it will appear in the display area as the Story GUI 580 and within the boundaries 570 and 572.

A creator may decide to seek collaboration from contributors at 505 during (e.g., off-line activity) and after creation of a Story GUI (during real-time activity). Generally, collaboration can be defined as two separate collaborator groups. The first collaborator group shown at 506, 507, 508 represents contributors that can in one way or another interactively engage in the design of the Story GUI and also the campaign itself during both off-line and real-time launch activity. The second collaborator group 511 represents the Influencers just discussed above at 440 that a creator may solicit at 510 in crafting the design of the Story GUI itself. In one use case scenario, the Story GUI creator 502 through 505 elects not to utilize a contributor at (506, 507, 508) but selects 510 an artist Influencer at 511 and proceeds to the art palette 540 to select the art module(s) 542 that will be used to create the images at 566 that result in the final Story GUI 564 that is uploaded 560 to the circle display area at 580 within set boundaries that may be represented at 570. In another scenario, the Story GUI creator may select from (506, 507, 508) but require no GUI assistance at 509 and proceed directly to 540 to create the Story GUI.

For example, a creator 502 may select a co-creator at 506 which may be another student working as a two-person team. A beneficiary 507 may represent a client from a non-profit such as a cancer patient at St. Further, the beneficiary may request assistance at 510 from an artist influencer 511 (e.g., and as shown at 442 in FIG. 4) to complete the GUI element of the Circle campaign. A group 508 represents multiple embodiments of collaboration and engagements. As defined at 520, these participants represent embodiments of collaboration in the Story GUI as well as engagement during the real-time activity phase of a Story GUI. For example, a Supporter is invited by the creator to offer various embodiments of annotated insights (e.g., TouchPoints at 522 and further discussed in FIG. 6) enabling the Supporter to click a separate GUI that may be transposed on the Story GUI, for example, that reveals insight (behavior) by the creator and allowing the Supporter to use the tool to add custom visual not just textual annotations. For example, a Supporter might decide to visually express the intent behind the art with their own art.

In other group collaborative embodiments, exemplary contributions to the Story GUI can be represented in the form of engagement contributions to the GUI storyline that serves to promulgate the story telling narrative. For example, a local artist influencer on a Circle campaign can create their own interpretation of the creator's intent and create their own Story GUI that can be added to the campaign and layered within the circle stack (discussed in FIG. 8) shown at 550 as a story contributor not just an influencer contributor. In another scenario, a ("Secret Artist—i.e. famous artist") can join a Circle campaign at the time of campaign creation or during the campaign. The secret artist can remain anonymous with their Story GUI creation revealed at the end of the campaign as an incentive for user participation. This contributor at 520 can select from various contribution/engagement interfaces at 522 thus utilizing the palette 540 within the Story Studio and displayed directly to 580 through the campaign control module as discussed in FIGS. 1-2 and revealed through the circle stack 550.

Since the Story GUI's may operate as a single campaign or in the hundreds of thousands or millions that could be controlled, they could also be combined or linked together to support a similar campaign theme. Similar to movie production where numerous contributors including writer, art director, graphic artist, editor etc. all combine together to create the finished visual story. The same can be achieved with numerous Story GUI's creating various elements that build the story or add to it.

For example, 20,000 students representing 20,000 individual GUI's, can be encouraged to participate in a campaign to raise awareness for (e.g., historical figures and their contributions to society). The students are incentivized (raise funds) and must pick a subject figure and tell their story through "artistic expression" utilizing the GUI storytelling interface. One theme but individual content from each student creator.

In another "group" 520 use case, a corporation (or through its digital marketing agency) that supports a Circle nonprofit beneficiary and the campaign cause, can engage the Story GUI creators and their communities through engagement interfaces at 522. As discussed in FIG. 1 (114), FIG. 2 (210) and FIG. 4 (424), the campaign control module and the campaign control system CCS may allow the facilitator to set campaign parameters that may include allowing a corporation that supports the campaign cause to actively engage the campaign participants through their Story GUI. For example, corporation X supports The Leukemia & Lymphoma Society (LLS). LLS decides to launch a campaign to 30,000 schools. LLS sets campaign themes and parameters in coordination with school facilitators. LSS may allow corporation X to participate in the campaign as a sponsor Supporter and contribute their "own" messaging through their own Story GUI as part of the storyline and accessed in the circle stack. Corporation X may be allowed to offer prizes, scholarships and other incentivized awards based on Story GUI creator performance.

FIG. 6 illustrates the components 600 of the Story GUI that allow it to function as a utility rather than just a visual design or surface treatment element. Further, the method application allowing for payment processing during a campaign within the Story GUI is shown at 650.

As shown, the components 600 show the computing devices 610 (also shown in FIG. 2 at 216) that support the Story GUI system. Creator devices (smartphones, tablets) previously discussed and shown at 612 demonstrate for illustration purpose how the Story GUI could look as displayed on computing device screens. The display area on computing devices that Story GUI can be applied to can be customized and is unlimited. For example, the entire device screen or glass shown at 620 can be the display area or "area of display" itself in which the Story GUI or subject matter 640 is applied as the surface ornamentation or where other custom display area embodiments 630 (e.g., circle shape) can be applied. (FIG. 9 discusses this further).

Custom generated Story GUI designs (subject matter as surface ornamentation) created by individual users or through the interactive collaborative efforts of contributors, enables the user(s) to interact with a computing device three ways: Firstly, the Story GUI system allows access to a method or process through a Story GUI (e.g., click an art module icon in the Story Studio) to get to a location within the system to use commands to manipulate graphic software to produce a new graphic storytelling interface (Story GUI as the new subject matter) at 640, and secondly, share that Story GUI content as a custom Story GUI that is interactive (it has movement, it can change when viewers take actions (e.g., art changes with a pledge), it initiates a storytelling sequence when touched, and thirdly, allows other GUI's 670 on the device screen to be touched that facilitate the process of raising awareness of a cause resulting in a touch heuristic 650, to process a payment (the business method). For example, multiple GUI's 670 can show a funding goal in real-time, a headline of the beneficiary, the campaign theme and the identity of the creator and influencers.

The GUI's 660 shown at 664 and 662 and 668 represent interactive viewer interfaces within the Story GUI itself that are separate from the creator GUI 640 but can affect its function. The GUI 664 shown in the center of the display area can indicate who the creator is or a name given to the work of art. The GUI represented at 662 can initiate the story sequence launch (e.g., touch my art and discussed in FIG. 7) that when touched initiates a circular function of the Story GUI in a sequential movement. In another case, an annotated GUI 668 referred to as a TouchPoint and initiated by the creator through the creator control module, allows viewers to touch the highlighted TouchPoint GUI's transposed over the storytelling GUI to reveal insight from the creator and consequently, invites the viewer to respond by revealing their own insight via text or their own visual interpretation which can be viewed by all participants in a separate circle in the circle stack.

Figure 7:
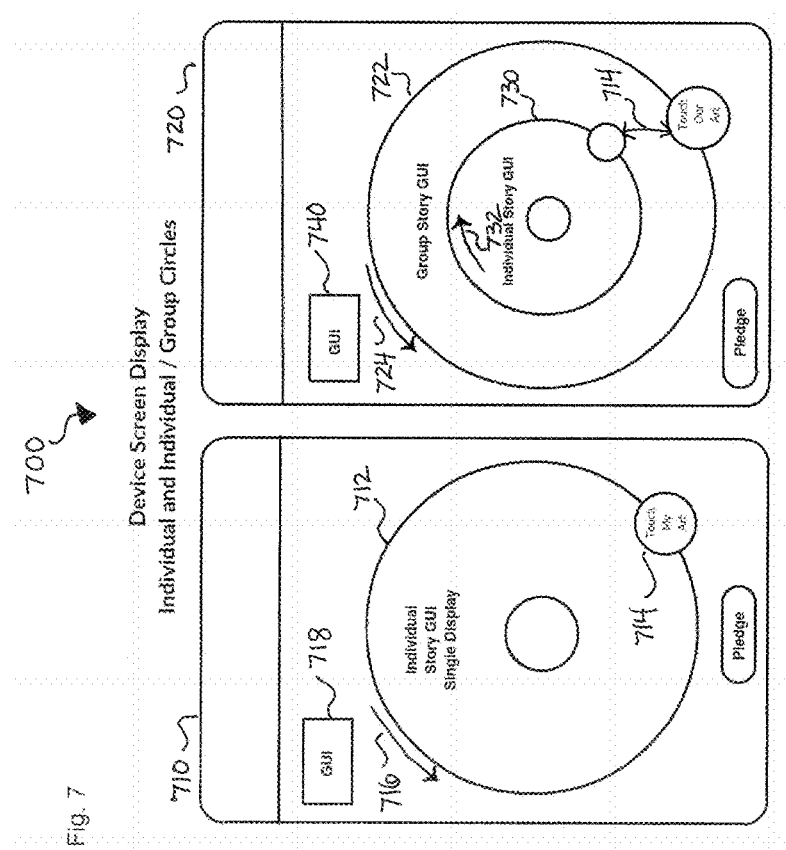
FIG. 7 illustrates an embodiment of the Story GUI creation system where individual Circles can appear and integrate in collaboration with group Circles in the same campaign.

FIG. 7 illustrates possible examples of a Story GUI that could be displayed 700 in use cases where there is a single individual GUI 712 or in a single/group combination 722-730. As shown, a single GUI 712 appears on a viewing computing device 710 where a sequence launch GUI 714 is touched or clicked (web interface) to initiate the story telling sequence. This sequence can involve a counterclockwise movement shown at 716 so a story image can read left to right or the GUI 712 can remain motionless as other GUI's 718 on the device screen support the campaign narrative. For example, by touching the "touch my art" GUI at 714, the story narrative can begin with other supporting GUI's 718 providing background narrative to the campaign before interactive GUI's within the Story GUI itself can be touched for interactive engagement as previously discussed in FIG. 6.

Computing device 720 shows an example where two separate GUI's can be displayed on the device screen for the same campaign. One for a group GUI 722 and a GUI 730 for each individual creator in the same campaign. They can operate in a movement sequence as shown at 724 and 732 or remain motionless. Parameters can be set that allow the Story GUI facilitator to determine if any movement is required and in what direction and what speed. In some embodiments, it will be possible for each Story GUI to have a movement sequence whose speed is determined by factors such as pledges made, number of pledges or engagement activity (e.g., the GUI spins faster as activity increases).

With this in mind, a group GUI could operate where a school classroom of twenty students is represented as the group and each of the twenty students is an individual GUI. In an actual campaign setting, the classroom group may set a fundraising goal of $3,000 that is shown at GUI 740 with each student responsible to raise $150 towards the classroom goal. In one possible scenario, parameters can be set in the campaign control module that specifies that as each student GUI reaches its individual goal ($150), a portion of their GUI can be added to the group GUI, whereas, the group GUI is created by the actions of each individual GUI. Once all twenty students reach their funding goals, the Group GUI then becomes its own GUI. In another scenario, the group GUI can be created by the classroom before launch and each students group contribution is revealed once their individual GUI campaign funding obligation is achieved.

FIG. 8 illustrates a content storage system 800 for custom content created Circles represented as a stacking/path arrangement within the Story GUI system that allows any and all content generated by Story GUI system participants to be stored and accessed both during and after Circle campaigns.

As shown at device 802, the Story GUI as displayed 804 shows a possible pathway arrangement or stacking order where circles can be assigned path operations (e.g., by subject or activity), combining the same circle shapes which only affect paths between the selected paths set within the system. For example, one stacking path order may pertain to the number of GUI circles required to tell the story narrative. In all cases within the system, a possible GUI story telling sequence shown at 810 will always be the first circle in the stacking order since the Story GUI initiates the entire process.

As discussed above, 804 illustrates a path operation where the story narrative may require multiple GUI's to reveal the entire story narrative. A stacking tool icon shown as a separate GUI may appear that viewers can touch to go deeper into the stories sequential layering. A separate view of a possible stacking or layering is shown at 806.

Circle stacking and Path arrangements for all other content that may be generated within the system is shown at 808. The system will allow for assigning and determining path operations for campaigns based on set campaign parameters. Possible stacking arrangement orders could be set as follows: Stack 1: 810 GUI story circle(s) required; Stack 2: Beneficiary distribution circle(s); Stack 3: Patron contributions; Stack 4: Points; Stack 5: Communities; Stack 6: Perks; Stack 7: 3$^{rd}$ party collaborations.

Further, as campaigns are launched, path arrangements may be determined by pre-defined parameters or set to a path arrangement based on performance standards previously defined and set. For example, a Story GUI campaign may go viral and the comments from Patrons expressed through TouchPoints may rise to the second stacking level for all participants to view. In another scenario, one may be reminded of classical musical jukeboxes in which 45 RPM records could be viewed and selected by categories with a push of a button. The same can be achieved with a digital jukebox of Circles that can be touched on a smart device display screen for immediate viewing.

Digital imagery that can be created on mobile supported operating systems (e.g., inking or drawing applications on iOS and ANDROID supported computing devices) utilizing unlimited graphic frameworks and graphic toolkits and represented as art, could be displayed on computing device screens in various embodiments. In the case of Story GUI as previously discussed, the "digital art" created and expressed as Story GUI content is shown as displayed in an area in the shape of a circle (the article of manufacture) for the purpose of telling a visual story in a fundraising process. FIG. 9 illustrates other display area embodiments 900 that can support the Story GUI system.

FIG. 9 illustrates several "area of display" embodiments that Story GUI's can be displayed and their functions. In a simple use case, device 902 shows the Story GUI in a standard "screen shot" downloaded on the entire device screen in a left to right or right to left movement swipe of the finger. Campaign supported content elements as illustrated can appear below the Story GUI content to facilitate the system requirements.

The "area of display" embodiment shown at 806 is represented as a digital book with pages that can be flipped with touch to display all content generated within the Story GUI system. Instead of a circle stack path arrangement for Circles previously discussed above and illustrated in FIG. 8, the stack with a digital book is displayed as pages.

The "area of display" shown at 910 besides having a circle shape, has a different function as opposed to other embodiments discussed. In this case, "panels" shown at 908 and similar to comic strip panels, allow the creator to tell a visual story using a comic strip format. Panel parameters such as size and quantity can be set within the Story Studio utilizing standard pre-set formats or custom creation tools. In one use case scenario, the creator can create a strip format with characters and message theme, yet leave the last panel with an open "word cloud" that viewers fill in, with the creator choosing the best "caption" as part of a caption contest to encourage engagement and campaign discussion. The "strip" could have movement as shown at 909 encouraging visual engagement with touch actions that can control movement (start and stop). All viewer caption contributions can be stored in a separate "circle stack" for all participants to read and review.

Figure 10:
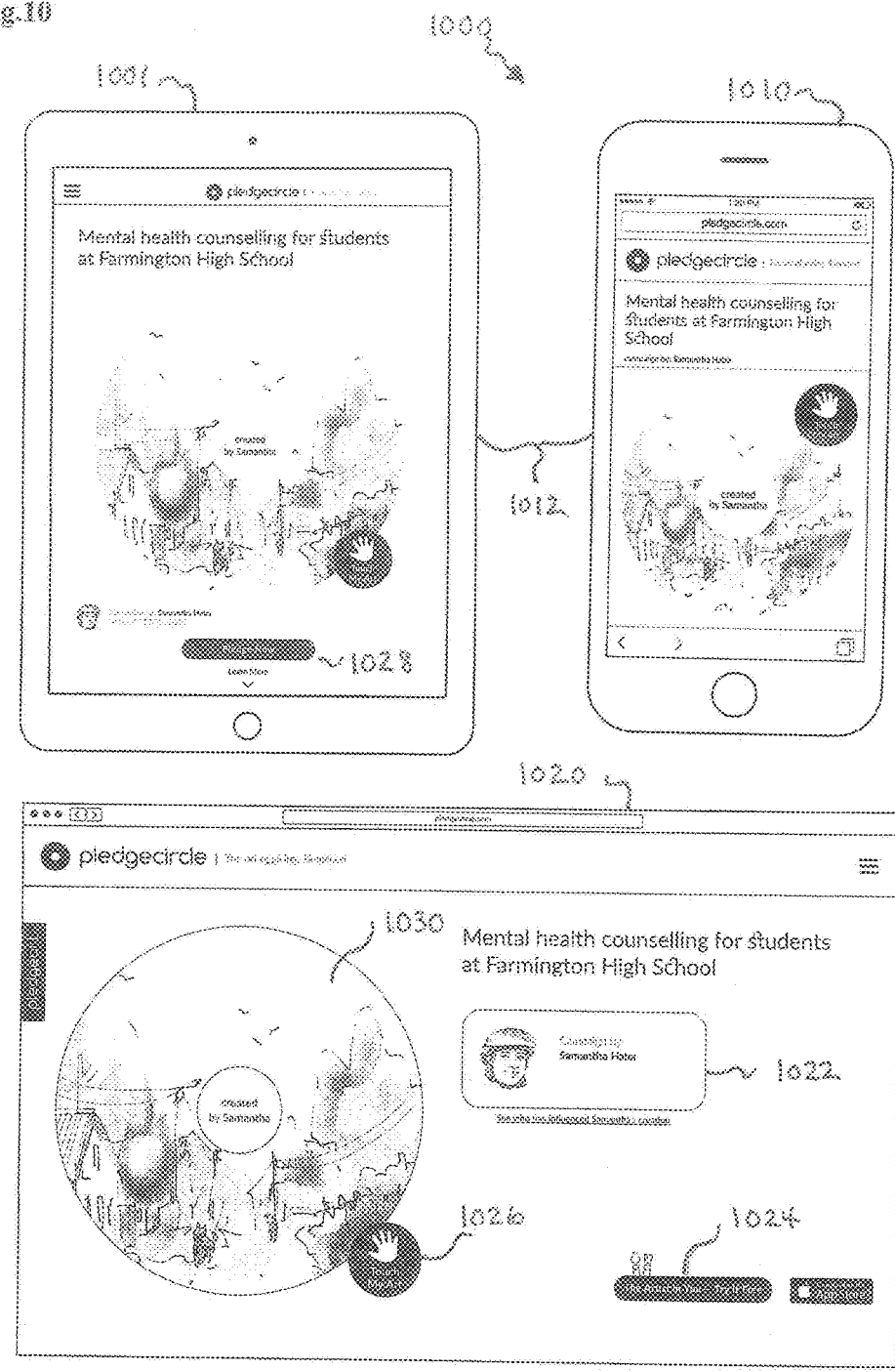
FIG. 10 illustrates an example of the Story GUI configured across web and mobile based computing devices in the execution of a system campaign.

FIG. 10 shows an illustration of the Story GUI system as it can appear and configured for all web and mobile based computing devices 1000 in the creation, control and management of a Circle campaign. Creator devices 1012 shown as smartphone 1010 and tablets 1001 that are also supported by web based devices 1020 such as a desktop. The Story GUI 1030 and GUI's such as 1026 that affect the function of 1028 is apparent as well as embodiments of other supporting GUI's shown as examples at 1022, 1024 and 1028 complete the system requirements.

Although the implementations set forth in the application have been described and illustrated with a certain degree of particularity, it is understood that the present disclosure has been made only by way of examples, and that numerous changes in the combination and arrangement of components can be resorted to by those skilled in the art without departing from the spirit and scope of the disclosure.

In some implementations, the Story GUI system described provides an innovation over prior methods and processes to communicate a need to raise awareness for causes. For example, visual platforms in current use are primarily used to draw or send photos or videos with filter devices for personal expression. The Story GUI allows users to craft their own compelling visual story content using only their finger or a stylus, share what matters most to them, and in the process support campaigns, all in one integrated creation, control and managed system.

I claim:

1. A system for providing a visual storytelling interface used in a campaign, the system comprising:
   at least one processor;
   at least one memory configured to store instructions executed by the at least one processor;
   a graphical user interface (GUI) campaign control, deployment, and management server operated by the at least one processor, the GUI campaign control, deployment, and management server being configured to enable facilitators to define parameters for visual storytelling interfaces associated with campaigns launched by the facilitators and being configured to deploy the visual storytelling interfaces for display on display screens of viewer computing devices; and
   a digital image creation server operated by the at least one processor and configured to enable generation of custom dynamically-generated GUI items to appear in the visual storytelling interfaces controlled by the GUI campaign control, deployment, and management server, the digital image creation server being configured to enable generation of the custom dynamically-generated GUI items by interacting with creator computing devices used by creators of the custom dynamically-generated GUI items,
   wherein the GUI campaign control, deployment, and management server is configured to receive, from a first facilitator, input related to one or more parameters for a first visual storytelling interface associated with a first campaign launched by the first facilitator and, based on the received input, define the one or more parameters for the first visual storytelling interface associated with the first campaign,
   wherein the digital image creation server is configured to receive, from a first creator computing device, a first dynamically-generated GUI item in a narrative storytelling format for inclusion in the first visual storytelling interface associated with the first campaign, the first dynamically-generated GUI item being created on the first creator computing device by a first creator and the first creator computing device being different than the GUI campaign control, deployment, and management server and the digital image creation server, and
   wherein the GUI campaign control, deployment, and management server is configured to:
      determine whether the first dynamically-generated GUI item meets the one or more parameters defined for the first visual storytelling interface associated with the first campaign,
      based on a determination that the first dynamically-generated GUI item meets the one or more parameters defined for the first visual storytelling interface associated with the first campaign, add the first dynamically-generated GUI item to the first visual storytelling interface associated with the first campaign, and
      execute the first visual storytelling interface associated with the first campaign by deploying, to viewer computing devices, the first visual storytelling interface with the first dynamically-generated GUI item created by the first creator,
   wherein the first dynamically-generated GUI item has a plurality of touchscreen interactive functions and heuristics configured to transform the first dynamically-generated GUI item into a different visual state or image through the interaction of viewers using the viewer computing devices,
   wherein the first visual storytelling interface associated with the first campaign comprises a group circle created by a group of contributors and a set of individual circles each created by an individual contributor within the group of contributors, the set of individual circles being united in interaction and being unique content circles linked together to complete a larger circle mural or circle stack of GUIs, the set of individual circles including the first dynamically-generated GUI item as a first dynamically-generated circle within the set of individual circles,
   wherein the first dynamically-generated circle comprises:
      a GUI prompt superimposed on the first dynamically-generated circle that begins a storytelling narrative that initiates rotation of the set of individual circles in a manner that facilitates movement that directs viewer attention to content within the first visual storytelling interface, the group circle being displayed together with the storytelling narrative involving rotation of the set of individual circles, and interactive touch functions within the first dynamically-generated circle that guide viewers to discover and learn about the first campaign.

2. The system of claim 1, wherein the first dynamically-generated GUI item is configured to move in a circular sequential motion at selected levels responsive to touch input of a viewer to commence a visual storytelling sequence, the circular sequential motion and the visual storytelling sequence being defined by the touchscreen interactive functions and heuristics of the first dynamically-generated GUI item.

3. The system of claim 1, wherein the first dynamically-generated GUI item comprises a plurality of transformations of the first dynamically-generated GUI item defined by the first creator that occur based on selected actions of a viewer touching the first dynamically-generated GUI item.

4. The system of claim 1, wherein the GUI campaign control, deployment, and management server is configured to enable the first creator to create and activate an annotation feature through touchscreen heuristics that allow for textual and visual messaging from the first creator to be added to the first visual storytelling interface based on viewer interaction with the annotation feature, the GUI campaign control, deployment, and management server is configured to receive, from at least one viewer, additional textual and visual messaging from the at least one viewer to be added to the first visual storytelling interface based on viewer interaction with the annotation feature, and the GUI campaign control, deployment, and management server is configured to re-deploy, to the viewer computing devices and the first creator computing device, the first visual storytelling interface with the textual and visual messaging added by the at least one viewer.

5. The system of claim 1, wherein a speed of a movement sequence associated with the set of individual circles is determined by engagement activity with the first campaign.

6. The system of claim 1, wherein the digital image creation server comprises:
   a front end campaign creation application configured to enable creator computing devices to create a plurality of custom created subject matter imagery for the first visual storytelling interface,
   a creator control application configured to manage the front end campaign creation application, and a digital image creation dashboard application configured to provide tools used to create the plurality of custom created subject matter imagery, wherein the first creator computing device has a collaboration application configured to allow a group of remote third party contributors to interactively engage with the first creator in creation of the first dynamically-generated GUI item during real-time launch activity, and wherein the digital image creation server is configured to receive, from the first creator computing device, the first dynamically-generated GUI item in the narrative storytelling format for inclusion in the first visual storytelling interface associated with the first campaign by receiving a portion of the first dynamically-generated GUI item created by the remote third party contributors.

7. The system of claim 6, wherein the digital image creation server is configured to receive, from multiple creator computing devices including the first creator computing device, multiple dynamically-generated GUI items for inclusion in the first visual storytelling interface associated with the first campaign, the multiple dynamically-generated GUI items including the first dynamically-generated GUI item and being generated during the first campaign, and wherein the GUI campaign control, deployment, and management server is configured to manage the multiple dynamically-generated GUI items in the first visual storytelling interface via a circle layering stack.

8. The system of claim 7, wherein the GUI campaign control, deployment, and management server is configured to manage the multiple dynamically-generated GUI items in the first visual storytelling interface using community user circle profiles and GUI's that visually communicate campaign metrics.

9. The system of claim 6, wherein the GUI campaign control, deployment, and management server comprises:
a front-end creator campaign manager application;
a front-end creator control application;
a back-end creator/facilitator campaign manager application;
a back-end campaign control application; and
a central campaign control application to coordinate external and internal campaign communications between a single or multiple campaign circles operating independently, or, multiple or group campaign circles in binding coordinated campaigns via network channel connections.

10. The system of claim 9, wherein the front-end creator campaign manager application is configured to allow a facilitator or creator to set campaign parameters during non-runtime activity.

11. The system of claim 9, wherein the back-end creator/facilitator campaign manager application is configured to allow at least one of a facilitator, a creator, or a third party collaborator to create a campaign theme and requirements during non-runtime activity.

12. The system of claim 9, wherein the front-end creator control application is configured to monitor individual campaigns during run-time activity with user interactions and manage expected states of a campaign.

13. The system of claim 9, wherein the back-end creator/facilitator campaign manager application is configured to create and upload campaign requirements and interface with the front-end manager application.

14. The system of claim 9, wherein the back-end campaign control application is configured to monitor and manage an expected state of campaigns during run-time activity.

15. The system of claim 9, wherein the central campaign control application is configured to connect or bind multiple campaigns to each other during a synchronized coordinated deployment.

16. The system of claim 15, wherein the central campaign control application comprises an application programming interface (API) server and web and mobile system applications used to manage non-runtime or off-line activity and used to perform run-time or real-time activity.

17. The system of claim 6, wherein the collaboration application is configured to allow the first creator to select a particular remote third party collaborator to help set a campaign theme and allow remote third party contributors associated with the particular remote third party collaborator to create their own dynamically-generated GUI items individually for inclusion in the first visual storytelling interface.

18. The system of claim 6, wherein the collaboration application is configured to allow collaboration with a first collaborator group of contributors including the remote third party contributors that contribute to the first campaign itself and a second collaborator group of influencers that craft the design of the first visual storytelling interface.

19. The system of claim 6, wherein the collaboration application is configured to allow the first creator to collaborate with the remote third party contributors who, from remote devices, participate jointly in the creation of the first dynamically-generated GUI item.

* * * * *